United States Patent
Ogawa et al.

(10) Patent No.: US 7,145,942 B1
(45) Date of Patent: Dec. 5, 2006

(54) RADIO RECEIVING SYSTEM

(75) Inventors: Yasutaka Ogawa, Sapporo (JP); Takeo Ohgane, Sapporo (JP); Toshihiko Nishimura, Sapporo (JP); Masashi Iwami, Gifu (JP); Jun Kitakado, Hashima (JP); Yoshiharu Doi, Gifu (JP)

(73) Assignees: Japan as represented By President Of Hokkaido University, Sapporo (JP); Sanyo Electric Co., Ltd., Moriguchi (JP)

( * ) Notice: Subject to any disclaimer, the term of this patent is extended or adjusted under 35 U.S.C. 154(b) by 780 days.

(21) Appl. No.: 10/089,076

(22) PCT Filed: Oct. 10, 2000

(86) PCT No.: PCT/JP00/07041

§ 371 (c)(1),
(2), (4) Date: Apr. 9, 2002

(87) PCT Pub. No.: WO01/28107

PCT Pub. Date: Apr. 19, 2001

(30) Foreign Application Priority Data

Oct. 12, 1999 (JP) ................................ 11-290093

(51) Int. Cl.
*H04B 1/707* (2006.01)
(52) U.S. Cl. ...................................... 375/148; 375/144
(58) Field of Classification Search ................ 375/140, 375/144, 147, 148
See application file for complete search history.

(56) References Cited

U.S. PATENT DOCUMENTS 6,091,788 A * 7/2000 Keskitalo et al. ........... 375/347
6,222,498 B1 * 4/2001 Ishii et al. ................... 343/853
6,584,115 B1 * 6/2003 Suzuki ......................... 370/441

FOREIGN PATENT DOCUMENTS

EP 0 930 727 7/1999
JP 11-205286 7/1999

OTHER PUBLICATIONS

T. Nishimura et al.; The Institute of Electronics, Information and Communication Engineers, vol. 99, No. 355—A-P99-139, pp. 103-108, Oct. 1999. See PCT search report.
M. Sawahashi et al.; The Institute of Electronics, Information and Communication Engineers, vol. 97, No. 320—A-P97-110, pp. 87-93, Oct. 1997. See PCT search report.
M. Tsutsui et al.; The Institute of Electronics, Information and Communication Enginners, vol. 98, No. 88—CS98-27, pp. 19-24, May 1998. See PCT search report.

* cited by examiner

*Primary Examiner*—Jay K. Patel
*Assistant Examiner*—David B. Lugo
(74) *Attorney, Agent, or Firm*—Westerman, Hattori, Daniels & Adrian, LLP.

(57) ABSTRACT

When once determined to be free of any demodulation error by an interference removing unit provided user by user, a replica signal calculated by the interference removing unit is subtracted from an input signal vector, and a calculated user signal is output as it is as a final user signal. When it is determined by the interference removing unit that there is a demodulation error, the user signal is again calculated by the interference removing unit of an interference canceller of a next stage. As subtraction of the replica signal corresponding to the user signal having a demodulation error from the input signal vector is inhibited, precision of the interference wave removal can be improved.

25 Claims, 23 Drawing Sheets

RADIO RECEIVING SYSTEM

TECHNICAL FIELD

The present invention relates to a radio reception system, and more specifically to a radio reception system in accordance with a communication method such as PDMA (Path Division Multiple Access), CDMA (Code Division Multiple Access) and the like, which is capable of removing, from a received signal, an interfering signal component from other user.

BACKGROUND ART

Recently, various methods of transmission channel allocation have been proposed to realize effective use of frequency, in mobile communication systems such as mobile telephones, of which some have been practically implemented.

FIG. 22 shows an arrangement of channels in various communication systems including FDMA (Frequency Division Multiple Access), TDMA (Time Division Multiple Access) and PDMA. Referring to FIG. 22, FDMA, TDMA and PDMA will be briefly described.

FIG. 22(a) represents channel arrangement of FDMA, in which analog signals of users 1 to 4 are subjected to frequency division and transmitted over radio waves of different frequencies f1 to f4, and the signals of respective users 1 to 4 are separated by frequency filters.

FIG. 22(b) represents a channel arrangement of TDMA, in which digitized signals of respective users are transmitted over the radio waves having different frequencies f1 to f4 and time-divided time slot by time slot (time slot: a prescribed time period), and the signals of respective users 1 to 8 are separated by the frequency filters and time-synchronization between a base station and mobile terminals of respective users.

Recently, PDMA method has been proposed to improve efficiency of use of radio frequency, as mobile telephones have come to be widely used. In the PDMA method, one time slot of one frequency is spatially divided to enable transmission of data of a plurality of users, as shown in FIG. 22(c). In the PDMA, signals of respective users are separated by the frequency filters, the time synchronization between the base station and the mobile terminals of respective users, and a signal extracting apparatus such as an adaptive array.

FIG. 23 represents a reception system of a conventional PDMA base station. In this example, in order to identify users 1 and 2, four antennas 3 to 6 are provided, outputs of respective antennas are applied to a frequency converting circuit 7, subjected to frequency conversion by corresponding local oscillation signal Lo, respectively, converted to digital signals by an A/D converter 8 and applied to a digital signal processor (DSP) 10.

DSP 10 includes adaptive arrays 11, 12, a reception signal vector calculator 13, a memory 14, a correlation value calculator 15 and a channel allocating apparatus 16. Adaptive arrays 11 and 12 extract, from reception signals output from A/D converter 8, only those signals from a specific user. Each adaptive array extracts a user signal designated by channel allocating apparatus 16, which will be described later, in accordance with a weight vector calculating method such as a method utilizing a preamble included in a time slot or a method utilizing a nature that an envelop of a modulation signal becomes constant, for example.

Reception signal vector calculator 13 receives as inputs the reception signals from A/D converter 8 and output signals from adaptive arrays 11, 12, calculates reception signal vectors corresponding to every user, and stores the results in memory 14. Channel allocating apparatus 16 designates two users for the memory 14 and the correlation value calculator 15. Correlation value calculator 15 calculates, among the reception signal vectors stored in memory 14, correlation value between reception signal vectors of the designated two users. Channel allocating apparatus 16 receives the calculated correlation value between the reception signal vectors of the two users. When the correlation value is not larger than a prescribed value, the two users are subjected to path division multiple connection to a time slot of the same time.

Adaptive arrays 11 and 12 shown in FIG. 23 extract signals of corresponding users 1 and 2, respectively. When a user 3 transmits a signal from the same direction as user 1, in addition to users 1 and 2, it follows that the signals from users 1 and 3 are mixed and output from adaptive array 11. The conventional adaptive array 11, however, cannot separate the signals of users 1 and 3, and hence, it has been impossible to extract the signal of user 1 only.

Therefore, an object of the present invention is to provide a radio reception system that can improve communication quality, by canceling unnecessary user signals using an interference canceller.

DISCLOSURE OF THE INVENTION

The present invention provides a radio reception system capable of receiving signals from a plurality of users using a plurality of antennas, including: signal processing means for performing a prescribed signal processing on the signals received by the plurality of antennas; a plurality of first signal extracting means for extracting signal components corresponding to the plurality of users, respectively, based on a signal output from the signal processing means; a plurality of first estimating means for estimating parameter information related to relation between the signal components extracted by the first signal extracting means and the signal output from the signal processing means; a plurality of first error determining means for determining whether the signal components corresponding to the plurality of users extracted by the first signal extracting means include a demodulation error or not, respectively; and first operating means for subtracting, from the signal output from the signal processing means, the extracted signal component determined by the first error determining means not to include any demodulation error, in consideration of corresponding parameter information.

Preferably, the radio reception system further includes a plurality of second signal extracting means for extracting, based on the signal output from the first operating means, signal components corresponding to users determined by the first error determining means to include a demodulation error, respectively; a plurality of second estimating means for estimating parameter information related to relation between the signal components extracted by the second signal extracting means and the signal output from the first operating means; and a plurality of second error determining means for determining whether the signal components extracted by the second signal extracting means include a demodulation error or not, respectively.

More preferably, the radio reception system further includes second operating means for subtracting, from the signal output from the signal processing means, the signal component extracted by the first and second signal extracting means determined by the first and second error determining means not to include any demodulation error, in consideration of corresponding parameter information.

More preferably, the radio reception system further includes third operating means subtracting, from the signal output from the first operating means, the signal component extracted by the second signal extracting means determined by the second error determining means not to include any demodulation error, in consideration of corresponding parameter information.

According to another aspect, the present invention provides a radio reception system capable of receiving signals from a plurality of users using a plurality of antennas, including: signal processing means for performing a prescribed signal processing on the signals received by the plurality of antennas; a plurality of first signal extracting means for extracting signal components corresponding to the plurality of users, respectively, based on a signal output from the signal processing means; a plurality of first estimating means for estimating parameter information related to relation between the signal components extracted by the first signal extracting means and the signal output from the signal processing means based on a correlation value between signal component of the corresponding user and signal component of another user; a plurality of first error determination means for determining whether the signal components corresponding to the plurality of users extracted by the first signal extracting means include a demodulation error or not, respectively; and first operating means for subtracting, from the signal output from the signal processing means, the extracted signal component determined by the first error determining means not to include any demodulation error, in consideration of corresponding parameter information.

Preferably, the radio reception system further includes a plurality of second signal extracting means for extracting, based on the signal output from the first operating means, signal components corresponding to users determined by the first error determining means to include a demodulation error, respectively; a plurality of second estimating means for estimating parameter information related to relation between the signal components extracted by the second signal extracting means and the signal output from the first operating means based on a correlation value between signal component of the corresponding user and signal component of another user; and plurality of second error determining means for determining whether the signal components extracted by the second signal extracting means include a demodulation error or not, respectively.

More preferably, the radio reception system further includes second operating means for subtracting, from the signal output from the signal processing means, the signal component extracted by the first and second signal extracting means determined by the first and second error determining means not to include any demodulation error, in consideration of corresponding parameter information.

More preferably, the radio reception system further includes third operating means subtracting, from the signal output from the first operating means, the signal component extracted by the second signal extracting means determined by the second error determining means not to include any demodulation error, in consideration of corresponding parameter information.

More preferably, the plurality of first estimating means estimate the parameter information by calculating the correlation value, independent from result of determination by the plurality of first error determination means.

More preferably, the plurality of first estimating means estimate the parameter information by calculating the correlation value using signal components of the users determined not to include any demodulation error, based on the result of determination by the plurality of first error determining means.

More preferably, the plurality of second estimating means estimate the parameter information by calculating the correlation value, independent from result of determination by the plurality of second error determination means.

More preferably, the plurality of second estimating means estimate the parameter information by calculating the correlation value using signal components of the users determined not to include any demodulation error, based on the result of determination by the plurality of second error determining means.

According to a still further aspect, the present invention provides a radio reception system capable of receiving signals from a plurality of users using a plurality of antennas, including: signal processing means for performing a prescribed signal processing on the signals received by the plurality of antennas; and one stage of interference cancellers, including a plurality of stages of interference removing units corresponding to the plurality of users; wherein each stage of the interference removing unit includes signal extracting means for extracting signal component corresponding to a specific user, different stage by stage, among the plurality of users based on an input signal, estimating means for estimating parameter information related to relation between the signal component extracted by the signal extracting means and the signal input to the signal extracting means, operating means for removing the signal component corresponding to the specific user, from the signal input to the signal extracting means in consideration of the parameter information, and error determining means for determining whether the signal component corresponding to the specific user includes a demodulation error or not, and when determined to include the demodulation error, disabling removal of the signal component corresponding to the specific user by the operating means; and the plurality of stages of interference removing units are connected such that the signal output from the signal processing means is input to inputs of the operating means and the signal extracting means of the first stage of the interference removing units, and an output of the operating means of a former stage interference removing unit of adjacent two interference removing units is applied to inputs of the signal extracting means and the operating means of a latter stage interference removing unit.

Preferably, the radio reception system further includes a next stage of interference cancellers receiving an output of the operating means of a last stage interference removing unit of the one stage of interference cancellers; wherein the next stage interference canceller includes a plurality of stages of interference removing units corresponding to the plurality of users; each stage of the interference removing units includes signal extracting means for extracting and outputting signal component corresponding to a specific user, different stage by stage, among the plurality of users, based on an input signal, estimating means for estimating parameter information related to relation between the signal component extracted by the signal extracting means and the signal input to the signal extracting means, operating means for removing the signal component corresponding to the specific user from the signals input to the signal extracting means, in consideration of the parameter information, and error determining means for determining whether the signal component corresponding to the specific user includes a demodulation error or not and, when determined to include an error, disabling removal of the signal component corresponding to the specific user by the operating means; the interference removing unit of the next stage interference canceller corresponding to a user determined not to include any demodulation error by the interference canceller of the first stage provides an output of the interference removing unit of the preceding stage as it is to the interference removing unit of the succeeding stage; and in the interference removing unit of the next stage interference canceller corresponding to the user determined to include a demodulation error by the first stage interference canceller, an output of the interference removing unit of the preceding stage is applied to inputs of the signal extracting means and the operating means, and an output of the operating means is output to the interference removing unit of the succeeding stage.

According to a still further aspect, the present invention includes a radio reception system capable of receiving signals from a plurality of users using a plurality of antennas, including: signal processing means for performing a prescribed signal processing on the signals received by the plurality of antennas; and one stage of interference cancellers; the one stage of interference cancellers includes a plurality of stages of interference removing units corresponding to the plurality of users; each stage of the interference removing units includes signal extracting means for extracting and outputting signal component corresponding to a specific user, different stage by stage, among the plurality of users, based on an input signal, estimating means for estimating, based on a correlation value between signal component of the specific user and signal component of another user, parameter information related to relation between the signal component extracted by the signal extracting means and the signal output from the signal processing means, error determining means for determining whether the signal component corresponding to the specific user includes a demodulation error or not, and operating means for removing the signal component corresponding to a user determined not to include a demodulation error from the signal output from the signal processing means, in consideration of the parameter information; and the plurality of stages of interference removing units are connected such that the signal output from the signal processing means is input to inputs of the operating means and the signal extracting means of the first stage of the interference removing units, and an output of the operating means of a former interference removing unit of adjacent two interference removing units is applied to an input of the signal extracting means of a latter stage interference removing unit.

Preferably, the radio reception system further includes a next stage of interference cancellers receiving an output of the operating means of the interference removing unit of the last stage of the one stage of interference cancellers; wherein the next stage interference canceller includes a plurality of stages of interference removing units corresponding to the plurality of users; each stage of the interference removing unit includes signal extracting means for extracting and outputting signal component corresponding to a specific user, different stage by stage, among the plurality of users based on an input signal, estimating means for estimating, based on a correlation value between signal component of the specific user and signal component of another user, parameter information related to relation between the signal component extracted by the signal extracting means and the signal output from the signal processing means, error determining means for determining whether or not the signal component corresponding to the specific user includes a demodulation error, and operating means for removing the signal component corresponding to the user determined not to include any demodulation error from the signal output from the signal processing means, in consideration of the parameter information; the interference removing unit of the next stage interference canceller corresponding to the user determined not to include any demodulation error by the first stage interference canceller outputs an output of the interference removing unit of the preceding stage as it is to an interference removing unit of the succeeding stage; and in the interference removing unit of the next stage interference canceller corresponding to the user determined to include a demodulation error by the first stage interference canceller, an output of the interference removing unit of the preceding stage is applied to an input of the signal extracting means, and an output of the operating means is output to the interference removing unit of the succeeding stage.

More preferably, the estimating means calculates correlation value between the signal component of the specific user and signal component of another user independent from result of determination by the error determining means, and estimates the parameter information based on the calculated correlation value.

More preferably, the estimating means calculates the correlation value using only the signal components of the users determined not to include any demodulation error based on the result of determination by the error determining means, and estimates the parameter information based on the calculated correlation value.

More preferably, the signal extracting means is an adaptive array spatially separating and extracting signal component corresponding to a specific user.

More preferably, the signal extracting means includes an adaptive array spatially separating and extracting signal component corresponding to a specific user, a demodulator demodulating an output of the adaptive array, and a re-modulator re-modulating an output of the demodulator.

More preferably, the signals from the plurality of users are signals transmitted in accordance with PDMA communication method.

More preferably, the signals from the plurality of users are signals transmitted in accordance with CDMA communication method.

More preferably, the signals transmitted in accordance with the CDMA communication method are spread by predetermined spreading codes in advance on a transmitting side, and the radio reception system further includes inverse spreading means for inverse spreading signals output from the signal processing means by corresponding spreading codes in accordance with CDMA communication method and applying the results to the signal extracting means.

BEST MODES FOR CARRYING OUT THE INVENTION

Figure 1:
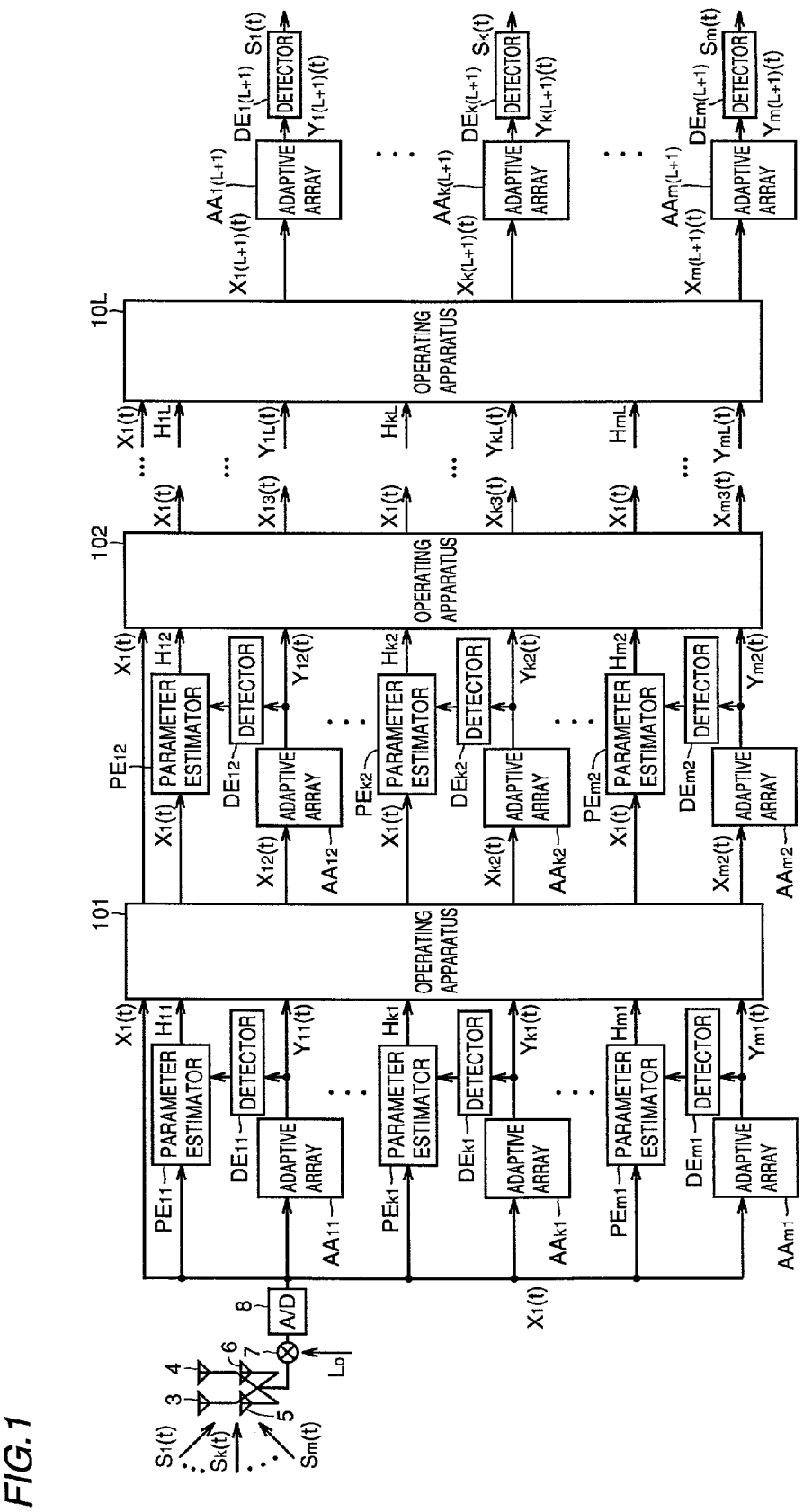
FIG. 1 is a block diagram of a reception system of a PDMA base station, as a basic concept of the present invention.

FIG. 1 is a block diagram representing a reception system for the PDMA base station proposed as a multistage interference canceller as a basic concept of the present invention. In the proposed reception system as the basic concept of the present invention, signals $S_1(t), \ldots, S_k(t), \ldots, S_m(t)$ from m (m is an integer not smaller than 2) users $1, \ldots, k, \ldots, m$ transmitted at the same time are mutually separated and taken out in parallel.

Figure 23:
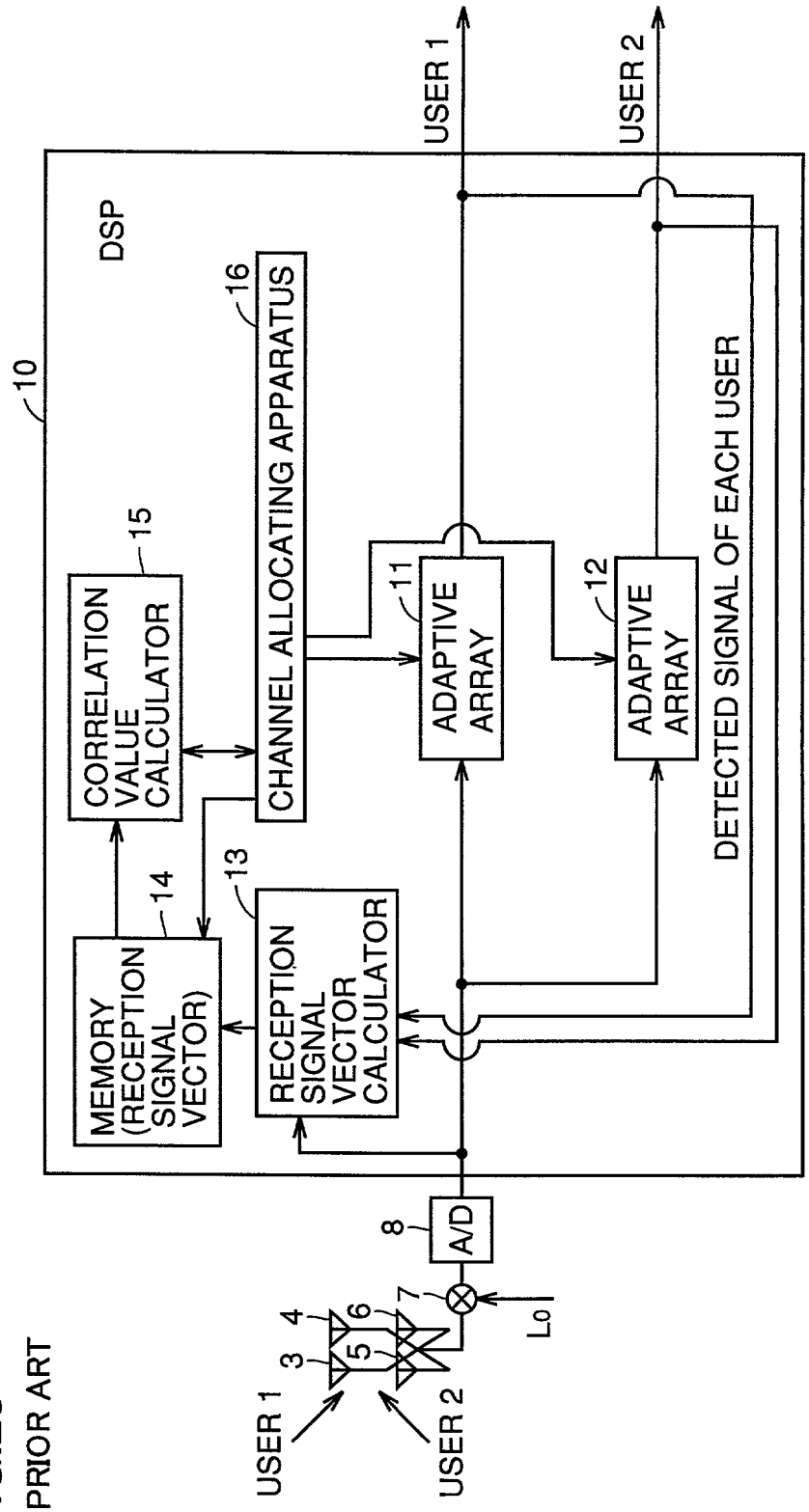
FIG. 23 is a block diagram representing the conventional reception system for the PDMA base station.

Referring to FIG. 1, as in the conventional example shown in FIG. 23, the reception system for the PDMA base station includes four antennas 3 to 6, frequency converting circuit 7 and A/D converter 8. An input signal vector $X_1(t)$ output from A/D converter 8 is applied to a first stage operating apparatus 101, first stage adaptive arrays $AA_{11}, \ldots, AA_{k1}, \ldots, AA_{m1}$, and to first stage parameter estimators $PE_{11}, \ldots, PE_{k1}, \ldots, PE_{m1}$. Details of the adaptive array will be described later.

Adaptive arrays $AA_{11}, \ldots, AA_{k1}, \ldots, AA_{m1}$ output user signals $Y_{11}(t), \ldots, Y_{k1}(t), \ldots, Y_{m1}(t)$ that are complex signals including with highest intensity the signal component of the corresponding users (and additionally including interference signal components from other users), respectively, which user signals are applied to the first stage operating apparatus 101 and detected by corresponding detectors $DE_{11}, \ldots, DE_{k1}, \ldots, DE_{m1}$.

Parameter estimators $PE_{11}, \ldots, PE_{k1}, \ldots, PE_{m1}$ estimate reception signal coefficient vectors $H_{11}, \ldots, H_{k1}, \ldots, H_{m1}$ of the corresponding users, based on the input signal vector $X_1(t)$ and corresponding detection outputs of detectors $DE_{11}, \ldots, DE_{k1}, \ldots, DE_{m1}$, and applies the estimated vectors to the first stage operating apparatus 101. More specifically, each parameter estimator estimates to what extent the signal component of the corresponding user is included in the input signal vector, to what extent the signal component of the corresponding user has its phase rotated with respect to the input signal vector, and so on.

The first stage operating apparatus 101 subtracts, for each user i ($i=1, 2, \ldots, m$), all the user signal components other than the user i of interest from the input signal vector $X_1(t)$, so as to eliminate the interfering signal component, and calculates and outputs further input signal vector $X_{i2}(t)$ of the user i. The operation of operating apparatus 101 will be described in detail later with reference to FIG. 2.

The first stage operating apparatus 101 outputs input signal vectors $X_{12}(t), \ldots, X_{k2}(t), \ldots, X_{m2}(t)$ corresponding to the users, and applies these to corresponding second stage adaptive arrays $AA_{12}, \ldots, AA_{k2}, \ldots, AA_{m2}$.

User signals $Y_{12}(t), \ldots, Y_{k2}(t), \ldots, Y_{m2}(t)$ output from the second stage adaptive arrays $AA_{12}, \ldots, AA_{k2}, \ldots, AA_{m2}$ are applied to the second stage operating circuit 102 and detected by corresponding detectors $DE_{12}, \ldots, DE_{k2}, \ldots, DE_{m2}$, respectively.

Parameter estimators $PE_{12}, \ldots, PE_{k2}, \ldots, PE_{m2}$ estimate reception signal coefficient vectors $H_{12}, \ldots, H_{k2}, \ldots, H_{m2}$ of the corresponding users based on the input signal vector $X_1(t)$ and the corresponding outputs of detectors $DE_{12}, \ldots, DE_{k2}, \ldots, DE_{m2}$, and applies the estimated vectors to the second stage operating apparatus 102. Operating apparatus 102 outputs further input signal vectors $X_{13}(t), \ldots, X_{k3}(t), \ldots, X_{m3}(t)$, and applies to third stage adaptive arrays $AA_{13}, \ldots, AA_{k3}, \ldots, AA_{m3}$ (not shown).

As a plurality of stages (first stage to Lth stage) of interference cancellers are provided in series, with each canceller including an adaptive array, a parameter estimator and an operating apparatus, the ratio of the signal components of other users included in the user signals output from respective stages are reduced stepwise, improving elimination of interference. As a result, communication characteristic can further be improved.

Figure 2:
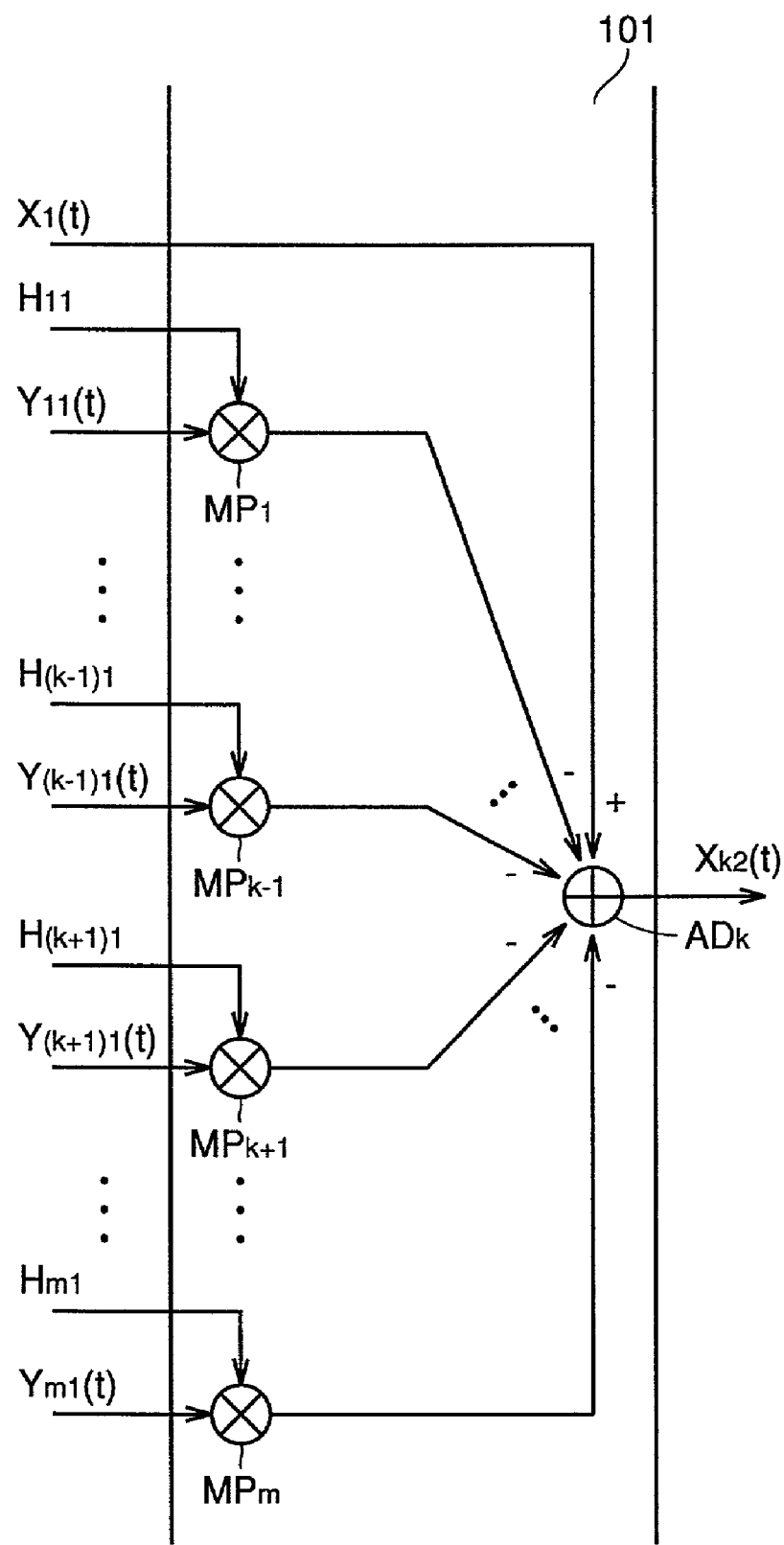
FIG. 2 is a block diagram representing a configuration of the operating apparatus shown in FIG. 1.

FIG. 2 is a specific block diagram of the operating apparatus 101 as an example of the plurality of stages of operating apparatuses shown in FIG. 1. Referring to FIG. 2, operating apparatus 101 includes multipliers $MP_1, \ldots, MP_{k-1}, MP_{k+1}, \ldots, MP_m$ and an adder $AD_k$. Though not shown for simplicity of description, it is understood that, in addition to the shown multipliers and the adder, operating apparatus 101 includes a multiplier $MP_k$ and adders $AD_1, \ldots, AD_{k-1}, AD_{k+1}, \ldots, AD_m$.

To the multipliers $MP_1, \ldots, MP_{k-1}, MP_{k+1}, \ldots, MP_m$, user signals $Y_{11}(t), \ldots, Y_{(k-1)1}(t), Y_{(k+1)1}(t), \ldots, Y_{m1}(t)$ from adaptive arrays $AA_{11}, \ldots, AA_{(k-1)}, AA_{(k+1)}, \ldots, AA_m$, as well as reception signal coefficient vectors $H_{11}, \ldots, H_{(k-1)1}, H_{(k+1)1}, \ldots, H_{m1}$ from parameter estimators $PE_{11}, \ldots, PE_{(k-1)1}, PE_{(k+1)1}, \ldots, PE_{m1}$ are applied.

The outputs of multipliers $MP_1, \ldots, MP_{k-1}, MP_{k+1}, \ldots, MP_m$ are applied to a negative input of adder $AD_k$, and the input signal vector $X_1(t)$ is applied to a positive input of adder $AD_k$. Thus, signal components corresponding to users other than user k are subtracted from input signal vector $X_1(t)$, and the signal component $X_{k2}(t)$ corresponding to the user k is output from adder $AD_k$. As described above, it is assumed that these adaptive arrays, parameter estimators and an operating apparatus as a whole constitute one stage of interference canceller.

As a result, considerable interfering signal components can be removed. By applying the new input vector $X_{k2}(t)$ of which interfering signal components removed considerably by the operating apparatus 101 to the second and the following stages of interference cancellers, the ratio of the interfering signal components of other users included in the user signal $S_k(t)$ that is finally output can sufficiently be reduced, realizing satisfactory communication characteristic.

To each of the adders not shown, other than adder $AD_k$, outputs from multipliers other than the multiplier corresponding to the adder of interest among multipliers $MP_1, \ldots, MP_k, \ldots, MP_m$ and the input signal vector $X_1(t)$ are applied in parallel, in the similar manner. These adders respectively output new input signal vectors shown in FIG. 1 and apply the same to the second and the following stages of interference cancellers.

Specific operation of the apparatus shown in FIGS. 1 and 2 will be described in the following.

When we represent the number of antenna elements by n and the number of users communicating simultaneously by m, the input signal vector $X_1(t)$ output from A/D converter 8 can be represented by the following equations.

$$X_1(t)=[x_1(t), x_2(t), \ldots x_n(t)]^T \quad (1)$$

$$x_j(t)=h_{j1}S_1(t)+h_{j2}S_2(t)+ \ldots +h_{ji}S_i(t)+ \ldots +h_{jm}S_m(t)+n_j(t), (j \leq 1, 2, \ldots, n) \quad (2)$$

The equations (1) and (2) in vector representation provide the following equation (3).

$$X_1(t)=H_1S_1(t)+H_2S_2(t)+ \ldots +H_iS_i(t)+ \ldots +H_mS_m(t)+N(t) \quad (3)$$

$$H_i=[h_{1i}, h_{2i}, \ldots, h_{ni}]T, (i=1, 2, \ldots, m) \quad (4)$$

$$N(t)=[n_1(t), n_2(t), \ldots, n_n(t)]^T \quad (5)$$

The operation in which the new input signal vector $X_{k2}(t)$ is output from operating apparatus 101 of FIG. 2 will be described in greater detail.

It is assumed that $H_i$ (i=1, 2, . . . , m) can be estimated by parameter estimators $PE_{11}, \ldots, PE_{k1}, \ldots, PE_{m1}$. Further, assuming that the first stage of adaptive arrays $AA_{11}, \ldots, AA_{k1}, \ldots, AA_{m1}$ operate relatively satisfactory, it is possible to regard that $Y_{i1}(t) \approx S_i(t)$.

In this stage, it follows that all the user signals and the reception signal coefficient vectors of all the user signals can be obtained. Here, the input signal vector $X_{k2}(t)$ used for signal detection of the user k for the second stage can be calculated in accordance with the equation (6).

$$X_{k2}(t)=X_1(t)-H_1S_1(t)- \ldots -H_{k-1}S_{k-1}(t)-H_{k+1}S_{k+1}(t)-H_mS_m(t) \quad (6)$$

By substituting the equation (3) for the equation (6), the following equation (7) results.

$$X_{k2}(t)=H_kS_k(t)+N(t) \quad (7)$$

When $X_1(t)$ is compared with $X_{k2}(t)$, it can be seen that interfering component $S_i(t)$ (i=1, 2, . . . m, where i≠k) other than $S_k(t)$ is reduced in $X_{k2}(t)$, and therefore, operation of the second stage adaptive arrays is facilitated.

As shown in FIG. 1, in the multistage interference canceller consisting of a plurality of stages of interference cancellers connected to each other, the reception signal is separated user by user by the adaptive arrays, and the result obtained by removing user signals other than the user of interest as interfering waves from the reception signal is applied to the next stage interference canceller, as an input signal of the user of interest. As a result, in the next stage interference canceller, as the interfering waves of the input user signal are reduced, a user signal with superior communication characteristic can be obtained. By repeating removal of the interfering waves in this manner over a plurality of stages, the interfering waves can further be removed, CIR (Carrier to Interference Ratio) can further be improved, and it becomes easier to extract the desired user signal.

Though removal of interfering waves can surely be attained by using the above described multistage interference canceller, there are the following problems.

(1) In the example of the multistage interference canceller described above, the user signal extracted by each adaptive array is removed as the interfering wave component from the reception signal, without determining whether there is a demodulation error or not. Therefore, if there is a demodulation error in the user signal extracted by an adaptive array and the signal has somewhat deformed waveform, such as an impulse-like waveform, the output of each operating apparatus (input signal to the next stage interference canceller) obtained as a result of subtraction of such erroneous signal component from the reception signal would be affected, for example, there would be an impulse-like noise, because of the demodulation error.

(2) As described with reference to FIG. 2, each signal removed from reception signal $X_1(t)$ by adder $AD_k$ is a product of the reception signal coefficient vector calculated by each parameter estimator and the user signal extracted by each adaptive array (hereinafter referred to as a replica signal).

Here, the reception signal coefficient vector calculated by each parameter estimator does not take into account the correlation value between the user signal of the target user and the user signals of other users, and the vector is calculated assuming that the correlation value is 0.

Actually, there is correlation between a plurality of user signals, and therefore, the above described calculation method is not well match the actual propagation environment. Therefore, when the reception signal coefficient vector calculated in accordance with the calculation method in which the correlation value with the user signals of other users is assumed to be 0 is used to remove the interfering waves, it is possible that the output of each operating apparatus (input signal to the next stage interference canceller) includes an error.

The present invention provides a solution to the problems (1) and (2).

First Embodiment

Figure 3:
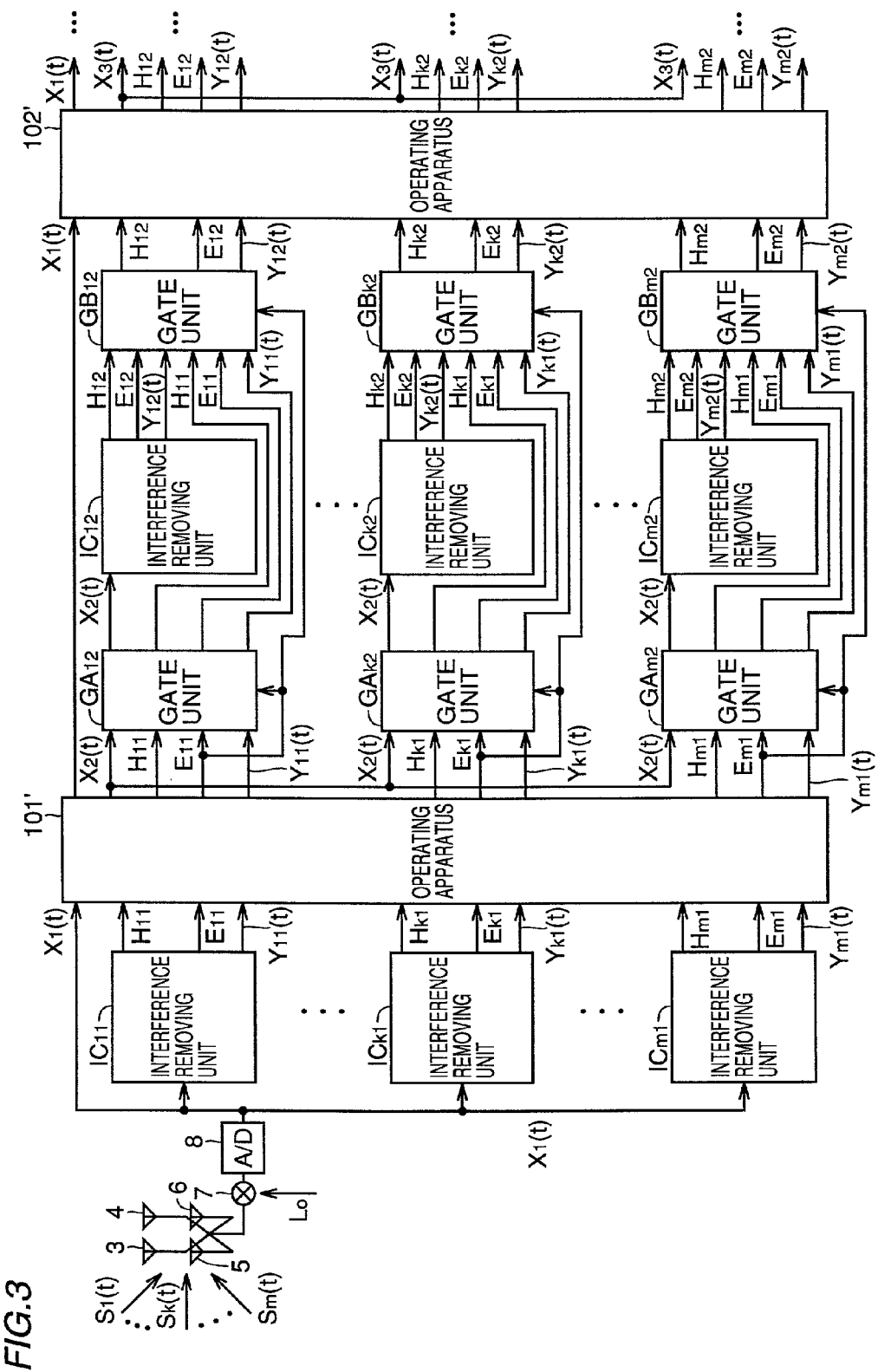
FIG. 3 is a block diagram of the reception system of the PDMA base station in accordance with a first embodiment of the present invention.

FIG. 3 is a block diagram representing the reception system for the PDMA base station in accordance with the first embodiment of the present invention.

Referring to FIG. 3, an operating apparatus 101', first gate units GA, interference removing units IC and second gate units GB, which are provided for each of a plurality of users, constitute a basic configuration of the first stage interference canceller.

Though not shown for the simplicity of description, the first gate units GA, interference removing units IC and second gate units GB are provided in the same manner as the first stage interference canceller for a plurality of users, in the succeeding stage of operating unit 102', so that operating apparatus 102' and components GA, IC and GB, not shown, constitute the second stage interference canceller.

Though not shown, succeeding the second stage interference canceller, there are a plurality of interference cancellers configured in the same manner as the first interference canceller (including the operating apparatus, first and second gate units and the interference removing units).

Therefore, the reception system of FIG. 3 is, as a whole, formed by multistages of interference cancellers, and the outputs of the second gate unit GB (not shown) provided for the plurality of users of the last stage interference canceller are provided as the final outputs of the reception system.

As in the reception system shown in FIG. 1, the input signal vector $X_1(t)$ is output from A/D converter 8, applied to operating apparatus 101' of the first stage interference canceller, and commonly applied to the plurality of interference canceling units $IC_{11}, \ldots, IC_{k1}, \ldots, IC_{m1}$ provided corresponding to the plurality of users in a preceding stage of the first stage interference canceller.

Figure 4:
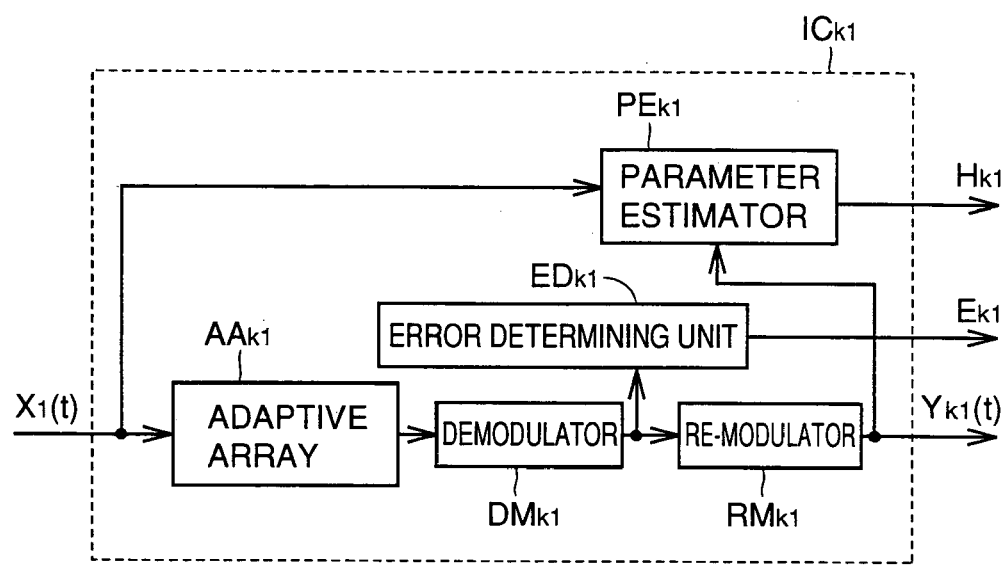
FIG. 4 is a block diagram representing a configuration of an interference removing unit shown in FIG. 3.

In the reception system shown in FIG. 3, the interference removing units IC all have the same configuration and, as an example, the configuration of interference removing unit $IC_{k1}$ is shown in FIG. 4.

Referring to FIG. 4, the complex signal of the user k extracted by adaptive array $AA_{k1}$ from the input signal vector $X_1(t)$ input to interference removing unit $IC_{k1}$ is converted to a bit information signal by a demodulator $DM_{k1}$. The bit information signal is applied to an error determining unit $ED_{k1}$ as well as to a re-modulator $RM_{k1}$.

Error determining unit $ED_{k1}$ determines whether there is a demodulation error in the extracted signal from adaptive array $AA_{k1}$, based on the bit information signal from demodulator $DM_{k1}$. When it is determined that there is a demodulation error, an error determination signal $E_{k1}$ at the L level is generated and applied to the operating apparatus 101' of the first stage interference canceller.

Re-modulator $RM_{k1}$ again converts the bit information signal from demodulator $DM_{k1}$ to the user signal $Y_{k1}(t)$, which is a complex signal, and applies the same to operating apparatus 101' of the first stage interference canceller as well as to the parameter estimator $PE_{k1}$.

Parameter estimator $PE_{k1}$ calculates the reception signal coefficient vector $H_{k1}$ of the corresponding user based on the input signal vector $X_1(t)$ and the user signal $Y_{k1}(t)$, and applies the calculated vector to operating apparatus 101' of the first stage interference canceller.

The arrangement including the adaptive array, a demodulator, an error determining unit, a re-modulator and a parameter estimator such as shown in FIG. 4 is common to all the interference removing units IC shown in FIG. 3, and therefore, overlapping description would not be repeated.

Figure 5:
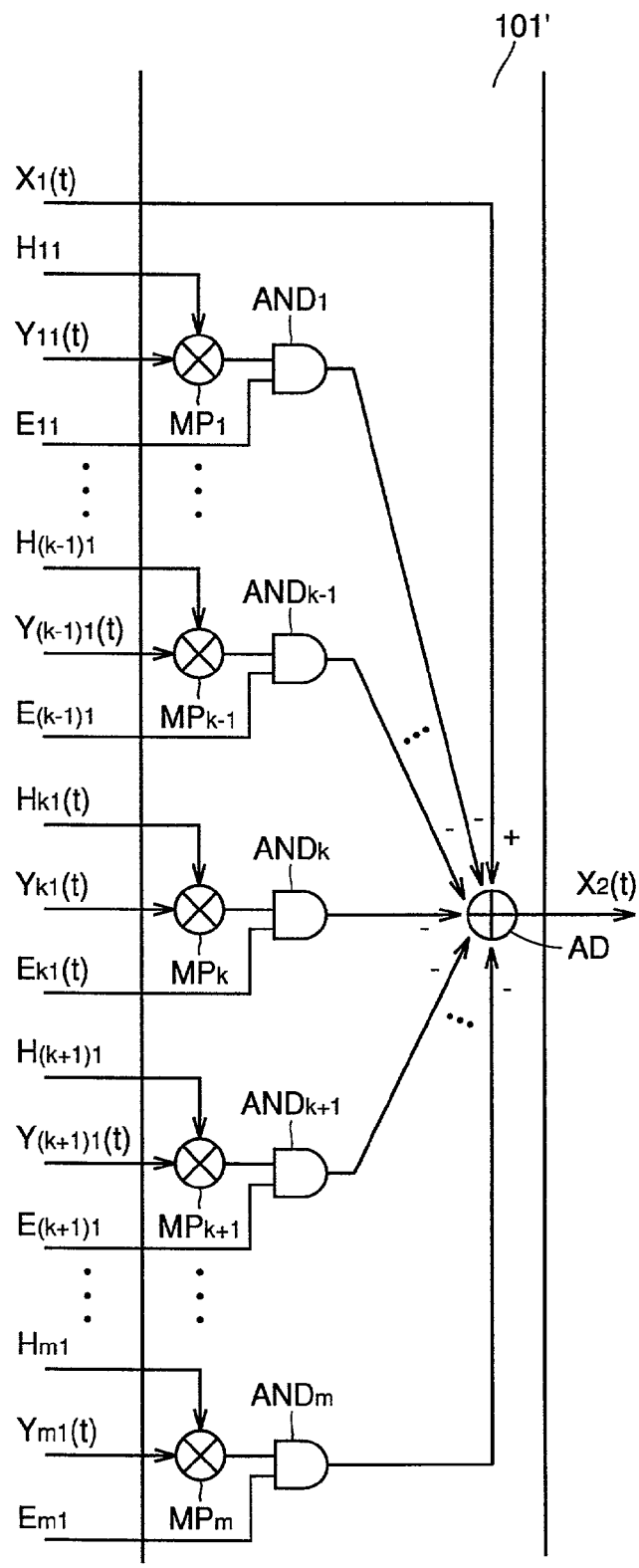
FIG. 5 is a block diagram representing a configuration of the operating apparatus shown in FIG. 3.

FIG. 5 is a block diagram representing a specific configuration of operating apparatus 101' of the first stage interference canceller, as an example of the plurality of stages of interference cancellers constituting the reception system shown in FIG. 3. Referring to FIG. 5, operating apparatus 101' includes multipliers $MP_1, \ldots, MP_{k-1}, MP_k, MP_{k+1}, \ldots, MP_m$, AND gates $AND_1, \ldots, AND_{k-1}, AND_k, AND_{k+1}, \ldots, AND_m$ and an adder AD.

To multipliers $MP_1, \ldots, MP_{k-1}, MP_k, MP_{k+1}, \ldots, MP_m$, user signals $Y_{11}(t), \ldots, Y_{(k-1)1}(t), Y_{k1}(t), Y_{(k+1)1}(t), \ldots, Y_{m1}(t)$ from the preceding stage interference removing units $IC_{11}, \ldots, IC_{(k-1)1}, IC_{k1}, IC_{(k+1)1}, \ldots, IC_{m1}$, and reception signal coefficient vectors $H_{11}, \ldots, H_{(k-1)1}, H_{k1}, H_{(k+1)1}, \ldots, H_{m1}$ are applied. Outputs of multipliers $MP_1, \ldots, MP_{k-1}, MP_k, MP_{k+1}, \ldots, MP_m$ are applied to one inputs of corresponding AND gates $AND_1, \ldots, AND_{k-1}, AND_k, AND_{k+1}, \ldots, AND_m$, respectively, and corresponding error determination signals $E_{11}, \ldots, E_{(k-1)1}, E_{k1}, E_{(k+1)1}, \ldots, E_{m1}$ from the preceding stage interference removing units $IC_{11}, \ldots, IC_{(k-1)}, \ldots, IC_{k1}, \ldots, IC_{m1}$ are input to the other inputs of these AND gates.

Outputs of AND gates $AND_1, \ldots, AND_{k-1}, AND_k, AND_{k+1}, \ldots, AND_m$ are applied to negative inputs of adder AD, and the input signal vector $X_1(t)$ from A/D converter 8 is applied to a positive input of adder AD.

The output of adder AD is provided from operating apparatus 101' as input signal vector $X_2(t)$, which is commonly applied to the first gate units $GA_{12}, \ldots, GA_{k2}, \ldots, GA_{m2}$ corresponding to the plurality of users, respectively, as shown in FIG. 3.

Though not shown in the block diagram of operating apparatus 101' of FIG. 5, the reception signal coefficient vectors $H_{11}, \ldots, H_{k1}, \ldots, H_{m1}$, the error determination signals $E_{11}, \ldots, E_{k1}, \ldots, E_{m1}$ and the user signals $Y_{11}(t), \ldots, Y_{k1}(t), \ldots, Y_{m1}(t)$ output from respective interference units $IC_{11}, \ldots, IC_{k1}, \ldots, IC_{m1}$ of the preceding stage are passed through operating apparatus 101' as they are, and applied to the corresponding first gate units $GA_{12}, \ldots, GA_{k2}, \ldots, GA_{m2}$ of the first stage interference canceller, user by user.

Now, referring to FIG. 5, an L level error determination signal $E_{11}$ from error determining unit $ED_{11}$ of interference removing unit $IC_{11}$ that corresponds to the user signal, e.g., the signal $Y_{11}(t)$, which is determined to have a demodulation error by the preceding stage interference removing unit as described above, is applied to the other input of the corresponding AND gate $AND_1$ of operating apparatus 101'. As a result, this AND gate is closed, and input of the product between the reception signal coefficient vector $H_{11}$ and the user signal $Y_{11}(t)$ output from the corresponding multiplier $MP_1$, that is, input of the replica signal to adder AD is prevented.

As a result, from the interference wave components (replica signals) of respective users to be subtracted from input signal vector $X_1(t)$, the interference wave component (replica signal) corresponding to the user signal that includes a demodulation error is excluded. As a result, the impulse-like noise, for example, will not be included in the input signal vector $X_2(t)$ output from operating apparatus 101' of the first stage interference canceller.

In the first stage interference canceller, the error signal $E_{11}$ that has passed through operating apparatus 101' from the preceding stage interference removing unit $IC_{11}$ is applied to a selective control input of the first gate unit GA corresponding to each user, gate unit $GA_{12}$ corresponding to user 1, for example.

When it is determined by the preceding stage interference removing unit $IC_{11}$ that there is an error, the first gate unit $GA_{12}$ selects, in accordance with the error determination signal $E_{11}$, the input signal vector $X_2(t)$ of high precision not including any noise, that is newly calculated by operating apparatus 101' and applies the same to interference removing unit $IC_{12}$.

As already described with respect to $IC_{k1}$ of FIG. 4 above, the interference removing unit $IC_{12}$ newly calculates, based on the input signal vector $X_2(t)$, a reception signal coefficient vector $H_{12}$, an error determination signal $E_{12}$ and a user signal $Y_{12}(t)$, which are applied to the second gate unit $GB_{12}$.

When it is determined by the preceding stage interference removing unit $IC_{11}$ that there is no error, the first gate unit $GA_{12}$ selects and applies to the second gate unit $GB_{12}$ the reception signal coefficient vector $H_{11}$, the error determination signal $E_{11}$ and the user signal $Y_{11}(t)$ that have passed through operating unit 101', in accordance with the error determination signal $E_{11}$.

To the selective control input of the second gate unit $GB_{12}$, the error determination signal $E_{11}$ is commonly applied to the first gate unit $GA_{12}$. When it is determined by the preceding stage interference removing unit $IC_{11}$ that there is an error, the second gate unit $GB_{12}$ selects and outputs the reception signal coefficient vector $H_{12}$, the error determination signal $E_{12}$ and the user signal $Y_{12}(t)$ that are newly calculated by interference removing unit $IC_{12}$ in accordance with the error determination signal $E_{11}$, and applies these to operating apparatus 102' constituting the second stage interference canceller.

When it is determined by the preceding stage interference removing unit $IC_{11}$ that there is no error, the second gate unit $GB_{12}$ selects and outputs the reception signal coefficient vector $H_{11}$, error determination signal $E_{11}$ and the user signal $Y_{11}(t)$ transmitted from the first gate unit $GA_{12}$ as they are, in accordance with the error determination signal $E_{11}$, and applies these as the reception signal coefficient vector $H_{12}$, the error determination signal $E_{12}$ and the user signal $Y_{12}(t)$, to operating apparatus 102' constituting the second stage interference canceller.

The same operation is performed by the gate units GA, GB and the interference removing units IC corresponding to users other than user 1, and therefore, description thereof will not be repeated.

In summary, in the above described operation, among the preceding stage interference removing units IC receiving the input signal vector $X_1(t)$, to the user determined to be free of any error, the reception signal coefficient vector H, the error determination signal E and a user signal Y(t) calculated by the interference removing unit IC are directly passed through the operating unit 101', the first gate unit GA and a second GB of the first stage interference canceller and applied to the second stage interference canceller. More specifically, for the user once determined to be free of any error by the interference removing unit IC, nothing is applied to the interference removing unit IC of the succeeding stage of the interference cancellers, and the reception signal coefficient vector H, the error determination signal E and the user signal Y(t) are not newly calculated.

Among the preceding stage interference removing units IC receiving the input signal vector $X_1(t)$, to the user determined to have an error, the interference removing unit IC of the first stage newly calculates the reception signal coefficient vector H, the error determination signal E and the user signal Y(t) and applies to the second stage interference canceller, based on the input signal vector $X_2(t)$ from which the interference wave is removed with high precision without introducing any noise by the operating apparatus 101' of the first stage interference canceller.

The operating apparatus 102' of the second stage interference canceller has the identical configuration as the operating apparatus 101' of the first stage interference canceller, and performs the same operation as that described with reference to FIG. 5. More specifically, only the replica signal corresponding to the user signal not including any demodulation error is subtracted from the initial input signal vector $X_1(t)$, and the next input signal vector $X_3(t)$ is output from adder AD (FIG. 5).

More specifically, for the user once determined to be free of any error by the preceding stage interference removing units $IC_{11}, \ldots, IC_{k1}, \ldots, IC_{m1}$, the replica signal thereof is always the object of subtraction from the initial input signal vector $X_1(t)$ at the interference canceller of any succeeding stage.

On the other hand, even when the user has been excluded from the object of subtraction from the initial input signal vector $X_1(t)$ at the operating apparatus 101' of the first stage interference canceller as it is determined to include an error by the preceding stage interference removing units $IC_{11}, \ldots, IC_{k1}, \ldots, IC_{m1}$, if it is determined to be free of any error by any of the interference removing units $IC_{12}, \ldots, IC_{k2}, \ldots, IC_{m2}$ of the first stage interference canceller, then the replica signal thereof is always an object of subtraction from the initial input signal vector $X_1(t)$ in the interference canceller of any of the succeeding stages.

As a result, in operating apparatus 102' of the second stage interference canceller, an input signal vector $X_3(t)$ can be obtained, from which interference wave is removed with higher precision without introducing any noise.

The operation of the second stage interference canceller including operating apparatus 102' is completely the same as that of the first stage interference canceller described above which includes operating apparatus 101', the first gate units $GA_{12}, \ldots, GA_{k2}, \ldots, GA_{m2}$, interference removing units $IC_{12}, \ldots, IC_{k2}, \ldots, IC_{m2}$, and the second gate units $GB_{12}, \ldots, GB_{k2}, \ldots, GB_{m2}$.

By connecting a plurality of stages of such interference cancellers in series, and by subtracting only the replica signal of the user which is determined to be free of any error from the initial input signal vector $X_1(t)$ at the operating apparatus of the interference canceller of each stage, it becomes possible to remove the interfering waves with high precision, at the interference canceller of each stage.

For the user once determined to be free of any error by the interference removing unit IC in any of the stages including the preceding stage, the reception signal vector H, the error determination signal E and the user signal Y(t) calculated by that interference removing unit IC are output from the second gate unit GB (not shown) of the interference canceller of the last stage, and from which, the user signal Y(t) is extracted and output from the reception system as the final, error-free user signal.

For the user determined to include an error by the interference removing unit IC of every stage, the reception signal coefficient vector H, the error determination signal E and the user signal Y(t) calculated by the interference removing unit IC of the interference canceller of the last stage are output from the second gate unit GB, and from which the user signal Y(t) is extracted and output from the reception system as the final user signal with an error.

The effect of the first embodiment will be more specifically described. The above described first embodiment is configured such that in each stage of the multiple stages of interference cancellers, the interference component corresponding to (error-free) user, that is, the replica signal, is removed from the initial input signal $X_1(t)$ by the operating apparatus. The first embodiment having such a configuration provides the following effects.

For example, assume that a reception signal of user 4 is to be found among four users. When users 1 and 2 only are determined to be free of any demodulation error by the preceding stage interference removing units $IC_{11}$ and $IC_{12}$, only the replica signals of users 1 and 2 are subtracted from the initial input signal vector $X_1(t)$ by the operating apparatus 101' of the first stage interference canceller. As a result, the reception signal $X_2(t)$ for the user 4 from the first stage interference canceller will be Initial input signal−(replica signal of user 1+replica signal of user 2).

Next, if it is determined that user 3 is also free of any demodulation error in addition to users 1 and 2, by the interference removing unit $IC_{32}$ of the first stage, the replica signals of users 1, 2 and 3 are subtracted from the initial input signal $X_1(t)$ by the operating apparatus 102' of the second stage interference canceller. As a result, the reception signal $X_3(t)$ for the user 4 of the second stage interference canceller will be Initial input signal−(replica signal of user 1+replica signal of user 2+replica signal of user 3).

Second Embodiment

Figure 6:
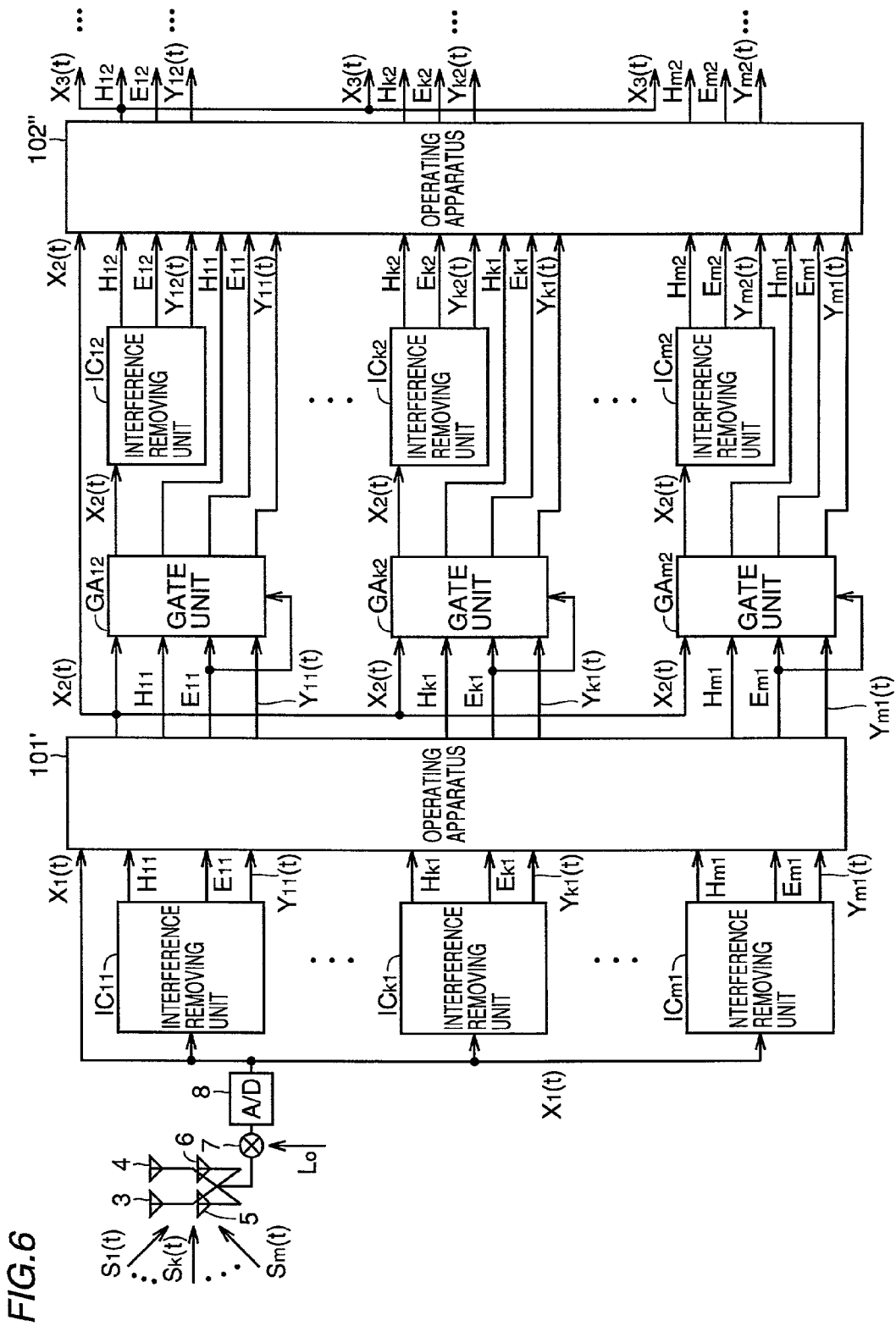
FIG. 6 is a block diagram of the reception system of the PDMA base station in accordance with a second embodiment of the present invention.

FIG. 6 is a block diagram representing the reception system for the PDMA base station in accordance with the second embodiment of the present invention. Different from the reception system in accordance with the first embodiment shown in FIG. 3 in which the replica signal is subtracted from the initial input signal vector $X_1(t)$ by the operating apparatus of the interference canceller of each stage, the reception system in accordance with the second embodiment is configured such that the interference component corresponding to each user, that is, the replica signal, is subtracted from an input signal vector that is newly calculated by the operating apparatus of the interference canceller of each stage.

The reception system in accordance with the second embodiment shown in FIG. 6 differs from the reception system in accordance with the first embodiment shown in FIG. 3 in the following points. Namely, in the first stage interference canceller including operating apparatus 101', gate units $GA_{12}, \ldots, GA_{k2}, \ldots, GA_{m2}$ and interference removing units $IC_{12}, \ldots, IC_{k2}, \ldots, IC_{m2}$, the input signal vector $X_2(t)$ output from operating apparatus 101 is applied, instead of $X_1(t)$ of FIG. 3, to the operating apparatus 102" of the second stage interference canceller. Further, in FIG. 6, the second gate unit GA shown in FIG. 3 is not provided. The reception signal coefficient vector X, error signal E and user signal Y(t) as the outputs of interference removing unit IC and the reception signal vector H, the error determination signal E and the user signal Y(t) passed from the preceding stage interference removing unit IC through gate unit GA are applied in parallel, to the operating apparatus 102" of the second stage interference canceller.

Figure 7:
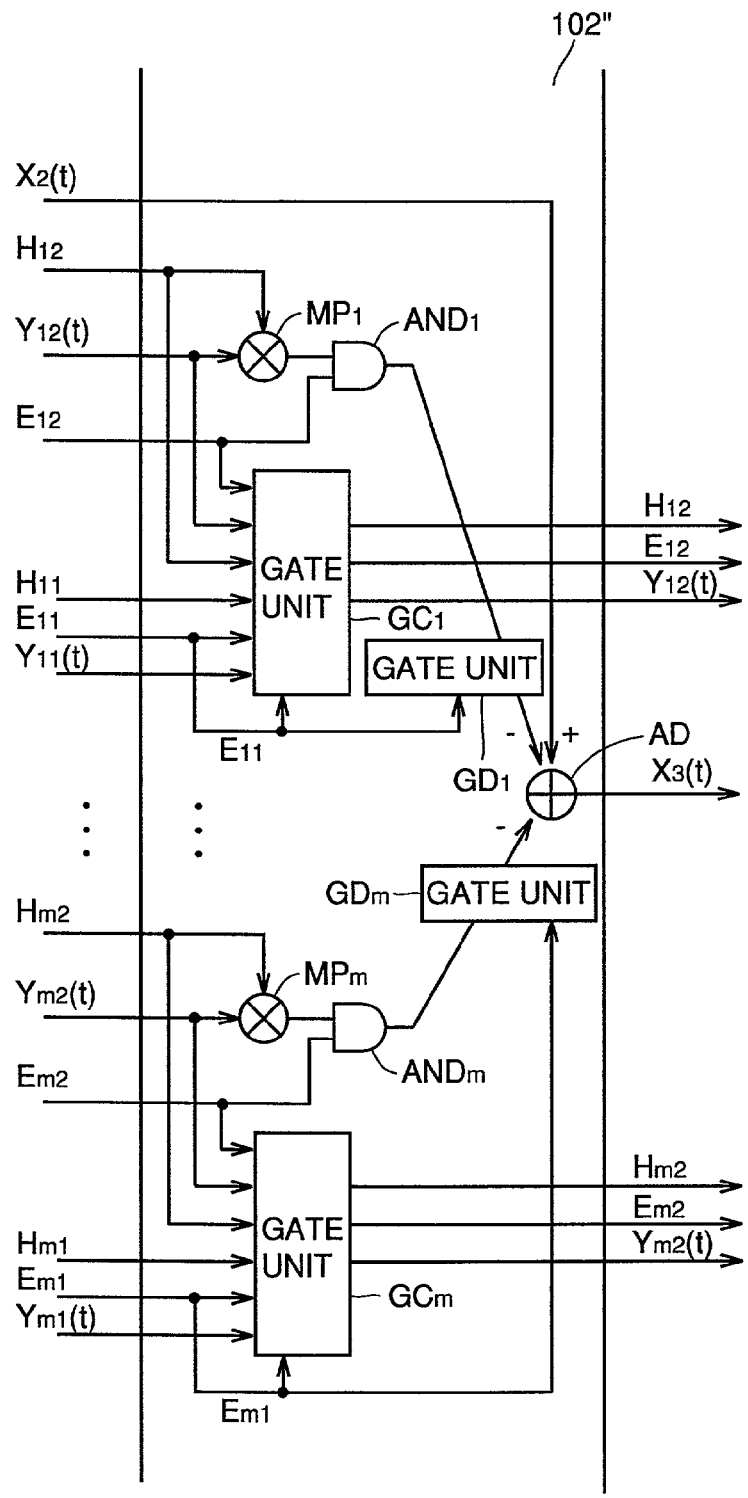
FIG. 7 is a block diagram representing a configuration of the operating apparatus shown in FIG. 6.

The operating apparatus 102" of the second stage interference canceller (and operating apparatuses of interference cancellers of the following stages) has such a configuration as shown in FIG. 7, and not the configuration shown in FIG. 5 described above.

In operating apparatus 102" shown in FIG. 7, the reception signal coefficient vector $H_{12}$, the error determination signal $E_{12}$ and the user signal $Y_{12}(t)$ from the interference removing unit IC of the preceding stage interference canceller, for example, from interference removing unit $IC_{12}$, and the reception signal coefficient vector $H_{11}$, the error determination signal $E_{11}$ and the user signal $Y_{11}(t)$ that have passed through the first stage interference canceller from the preceding stage interference removing unit $IC_{11}$ are applied to gate unit $GC_1$.

To the selective control input of gate unit $GC_1$, the error determination signal $E_{11}$ is applied. When error determination signal $E_{11}$ represents absence of any error, then the reception signal coefficient vector $H_{11}$, the error determination signal $E_{11}$ and the user signal $Y_{11}(t)$ from interference removing unit $IC_{11}$ are selected and output as the reception signal coefficient vector $H_{12}$, the error determination signal $E_{12}$ and the user signal $Y_{12}(t)$ and, when the error determination signal $E_{11}$ represents presence of an error, the reception signal coefficient vector $H_{12}$, the error determination signal $E_{12}$ and the user signal $Y_{12}(t)$ from interference removing unit $IC_{12}$ are selected and output.

The reception signal coefficient vector $H_{12}$ and user signal $Y_{12}(t)$ from the interference removing unit $IC_{12}$ of the first stage interference canceller are multiplied by multiplier $MP_1$, and an output thereof is applied to one input of AND gate $AND_1$. To the other input of AND gate $AND_1$, the error determination signal $E_{12}$ from interference removing unit $IC_{12}$ is applied.

Between AND gate $AND_1$ and adder AD, a gate unit $GD_1$ is provided, and the error determination signal $E_{11}$ is input to the selective control input of gate unit $GD_1$. When the error determination signal $E_{11}$ represents absence of any error, gate unit $GD_1$ is closed, so that the output of AND gate $AND_1$ is not applied to the negative input of adder AD. When error determination signal $E_{11}$ represents presence of an error, gate unit $GD_1$ is opened, applying the output of AND gate $AND_1$ to the negative input of adder AD.

To the positive input of adder AD, not the initial input signal vector $X_1(t)$ applied in the first embodiment but the input signal vector $X_2(t)$ calculated by operating apparatus 101' of the preceding stage interference canceller is input.

Though the configuration corresponding to user 1 has been described, it is understood that the operating apparatus 102" has the same configuration for users 1 to m.

The operation of the reception system in accordance with the second embodiment having the above described configuration is as follows. Among the preceding stage interference removing units $IC_{11}, \ldots, IC_{k1}, \ldots, IC_{m1}$ receiving the input signal vector $X_1(t)$, for the user determined to be free of any error, the reception signal vector H, the error determination signal E and the user signal Y(t) calculated by the interference removing unit IC of interest are directly passed through the operating unit 101' and the gate unit GA of the first stage interference canceller as well as the operating unit 102" and the gate unit GC of the second unit interference canceller, and applied to the gate unit GA of the second stage interference canceller (not shown).

Namely, for the user once determined to be free of any error by the preceding stage interference removing unit IC, nothing is applied to the succeeding stage interference removing unit IC.

For the user determined to have an error among the preceding stage interference removing units $IC_{11}, \ldots,$ $IC_{k1}, \ldots, IC_{m1}$ receiving the input signal vector $X_1(t)$, based on the input signal vector $X_2(t)$ from which the interfering wave has been removed with high precision without introducing any noise by operating apparatus 101' of the first stage interference canceller, the interference removing unit IC of the first stage interference canceller newly calculates the reception signal coefficient vector H, the error determination signal E and the user signal Y(t) and applies these to the operating apparatus 102" of the second stage interference canceller (FIG. 7).

In the operating apparatus 102" of the second stage interference canceller, only the replica signal corresponding to the user determined by the interference removing unit IC of the preceding stage (first stage) interference canceller to be free of any demodulation error is subtracted from input signal vector $X_2(t)$ output from the operating apparatus 101' of the preceding stage interference canceller.

Here, for the user 1 determined to be free of any error by any of the preceding stage interference removing units $IC_{11}, \ldots, IC_{k1}, \ldots, IC_{m1}$, for example, by interference removing unit $IC_{11}$, the replica signal thereof has been already subtracted from initial input signal vector $X_1(t)$ by operating apparatus 101', and it is not included anymore in the input signal vector $X_2(t)$ applied to the adder AD of operating apparatus 102". For the user 1 determined to be free of any error, the reception signal coefficient vector $H_{11}$, the error determination signal $E_{11}$ and the user signal $Y_{11}(t)$ as the outputs of the preceding stage interference removing unit $IC_{11}$ are selected, passed through the gate unit $GC_1$ of operating apparatus 102" and output to the succeeding stage. Therefore, to the interference removing unit $IC_{12}$ of the first stage interference canceller corresponding to user 1, $X_2(t)$ is not applied, and the reception signal coefficient vector $H_{12}$, the error determination signal $E_{12}$ and user signal $Y_{12}(t)$ are not provided.

Therefore, for the user already determined to be free of any error, the operation by multiplier $MP_1$ and AND gate $AND_1$ are not performed, and subtraction from the input signal vector $X_2(t)$ by adder AD is excluded. Even when the input $X_2(t)$ to interference removing unit $IC_{12}$ is 0, in order to prevent generation of any noise by the operation of interference removing unit $IC_{12}$ and input of the noise to adder AD through multiplier $MP_1$ and AND gate $AND_1$, gate unit $GD_1$ is closed for the user 1 determined to be free of any error, and the output from AND gate $AND_1$ to adder AD is completely shut out.

The effect of the second embodiment will be more specifically described. According to the second embodiment, the interference canceller of each stage is configured to remove the replica signal from the input signal vector calculated by the operating apparatus of one stage, by the operating apparatus of the next stage.

For example, assume that a reception signal of user 4 is to be found among four users. When it is determined that users 1 and 2 only are determined to be free of error by the preceding stage interference removing units $IC_{11}$ and $IC_{21}$, the reception signal vector $X_2(t)$ for the user 4 of the first stage interference canceller will be Initial input signal−(replica signal of user 1+replica signal of user 2).

In accordance with the second embodiment, the reception signal for user 4 of the second stage interference canceller will be $X_2(t)$−(replica signal of user 3).

More specifically, in the first embodiment described above, the replica signal is subtracted from the initial input signal vector $X_1(t)$ at the operating apparatus of the interference canceller of each stage. Therefore, the replica signal of a user once subtracted as being free of any error must be again subtracted from the input signal vector repeatedly at each succeeding stage. In the second embodiment, for the user already subtracted from the input signal vector as being free of any error, it is unnecessary to repeat subtraction from the input signal vector at the succeeding stages. Therefore, according to the second embodiment, the amount of calculation can significantly be reduced.

Third Embodiment

Figure 8:
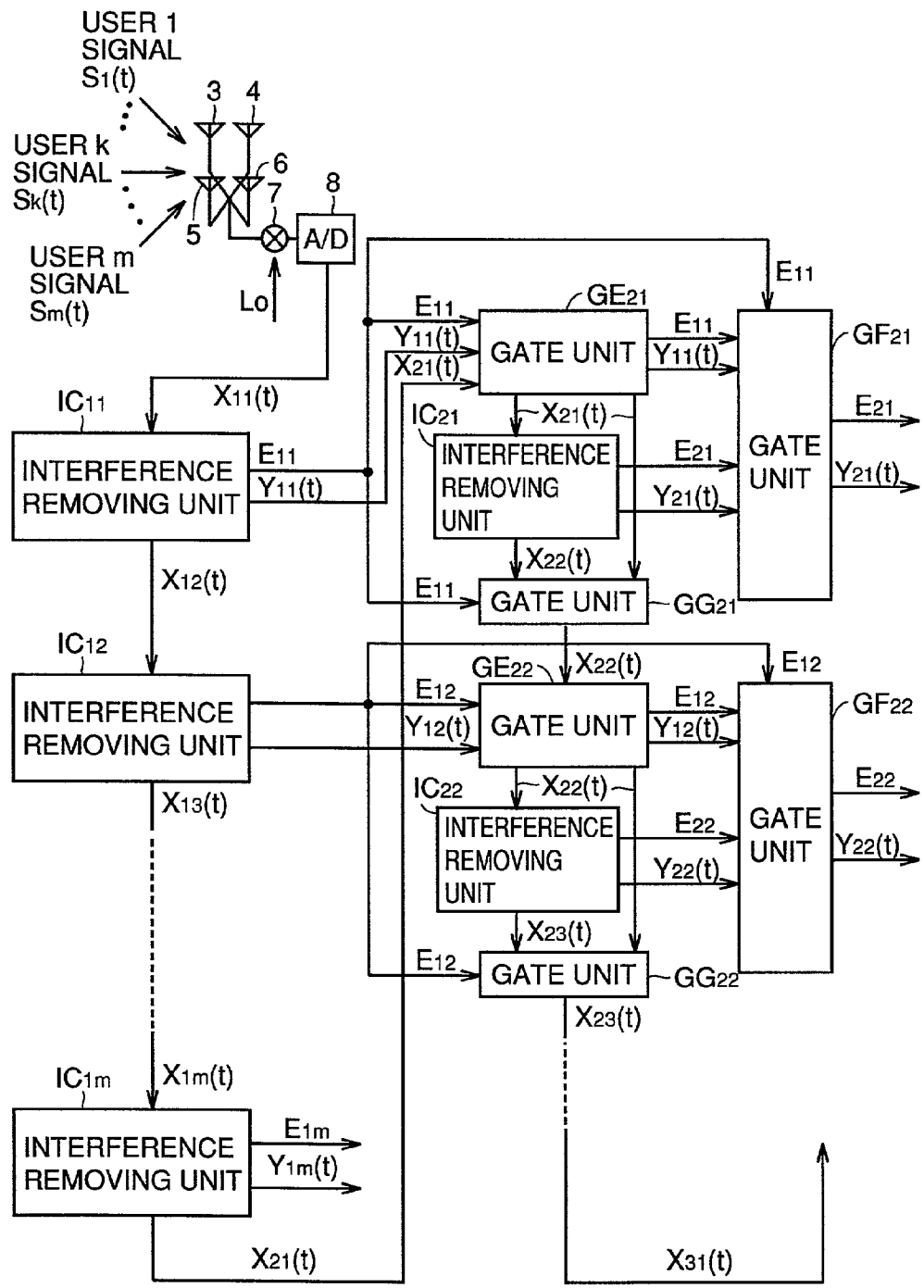
FIG. 8 is a block diagram of the reception system of the PDMA base station in accordance with a third embodiment of the present invention.

FIG. 8 is a block diagram representing a reception system for the PDMA base station in accordance with the third embodiment of the present invention. In the third embodiment, basically, from the reception signal vector $X_{1k}(t)$ used for signal detection for the user k at the kth stage interference removing unit $IC_{1k}$ in the longitudinal direction, a value obtained by multiplying the detected signal $Y_{1k}(t)$ of the user k and the reception signal coefficient vector $H_{1k}$ output from a parameter estimator is subtracted, and thus obtained signal vector is used as the input signal vector $X_{1(k+1)}(t)$ of the adaptive array of the (k+1)th interference removing unit $IC_{1(k+1)}$. Thus, the user signal $Y_{1(k+1)}(t)$ is extracted more accurately in the interference removing unit of the next stage.

More specifically, the input signal vector $X_{11}(t)$ output from A/D converter 8 is applied to the interference removing unit $IC_{11}$ of the first stage. In FIG. 8, interference removing units ICs all have the same configuration, and as an example, the configuration of interference removing unit $IC_{1k}$ is shown in FIG. 9.

Figure 9:
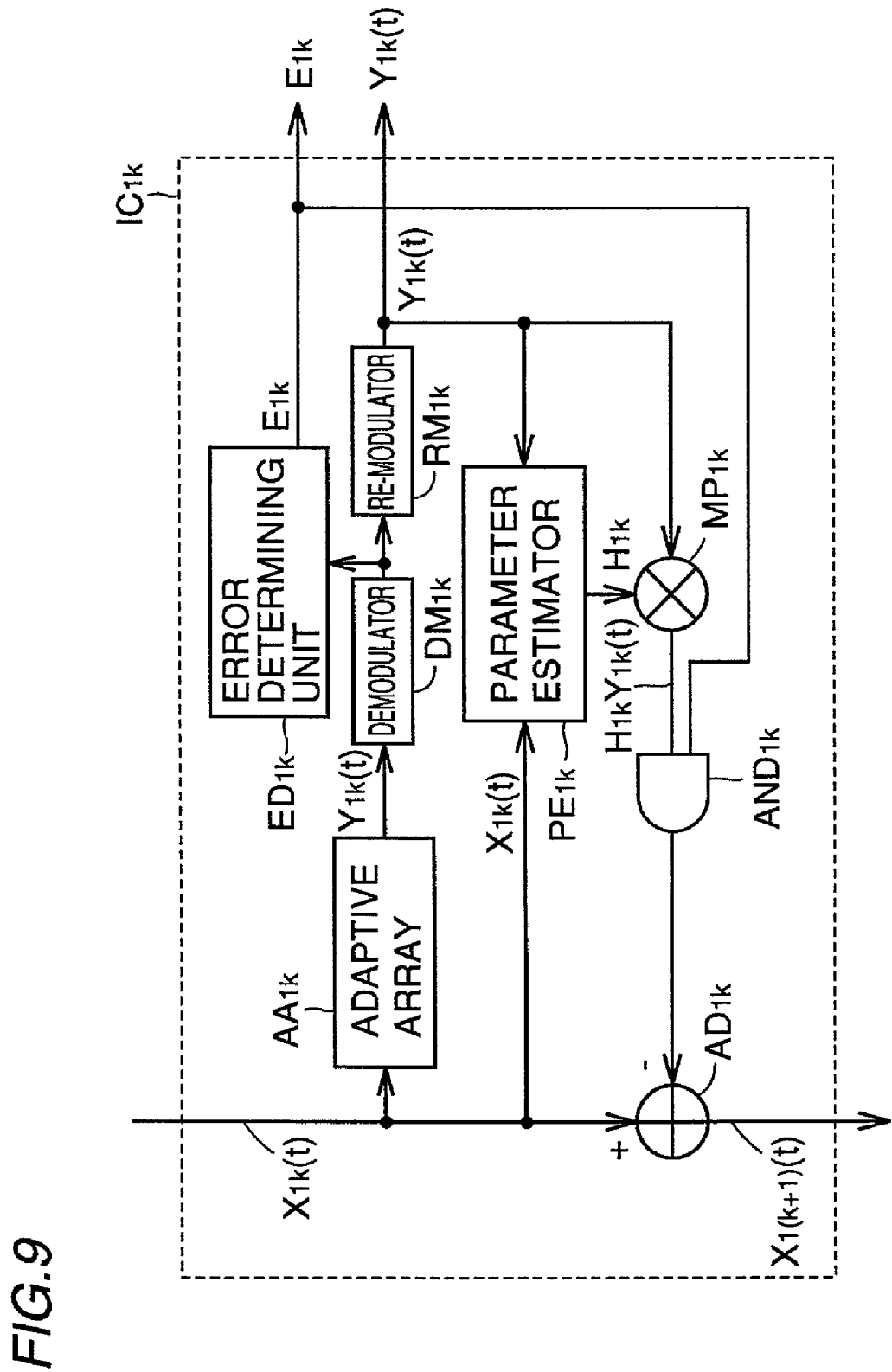
FIG. 9 is a block diagram representing a configuration of the interference removing unit shown in FIG. 8.

Referring to FIG. 9, the input signal vector $X_{1k}(t)$ applied from the interference removing unit $IC_{1(k-1)}$ of the preceding stage is input to adaptive array $AA_{1k}$ as well as to the positive input of adder $AD_{1k}$ and a parameter estimator $PE_{1k}$. By adaptive array $AA_{1k}$, the user signal $Y_{1k}(t)$ as a complex signal is extracted from input signal vector $X_{1k}(t)$, and converted by demodulator $DM_{1k}$ to a bit information signal. The bit information signal is applied to error determining unit $ED_{1k}$ as well as to re-modulator $RM_{1k}$. Based on the applied bit information signal, error determination unit $ED_{1k}$ determines whether there is a demodulation error in the extracted signal from adaptive array $AA_{1k}$. When it is determined that there is an error, an L level error determination signal Elk is generated and externally output. Re-modulator $RM_{1k}$ converts the applied bit information signal again to the user signal $Y_{1k}(t)$ as a complex signal and outputs. The user signal $Y_{1k}(t)$ is applied to parameter estimator $PE_{1k}$ and multiplier $MP_{1k}$ and, in addition, externally output.

Parameter estimator $PE_{1k}$ estimates the reception signal coefficient vector $H_{1k}$, based on the detected user signal $Y_{1k}(t)$ and the input signal vector $X_{1k}(t)$. Multiplier $MP_{1k}$ multiplies the reception signal coefficient vector $H_{1k}$ and user signal $Y_{1k}(t)$, and applies the result to a negative input of under $AD_{1k}$. Between multiplier $MP_{1k}$ and adder $AD_{1k}$, an AND gate $AND_{1k}$ is provided, and to one input thereof, error determination signal Elk is applied from error determination unit $ED_{1k}$.

Referring to FIG. 8, corresponding to users 1 to m, interference removing units $IC_{11}, \ldots, IC_{1m}$ are connected in series in the longitudinal direction, and m interference removing units constitutes the interference canceller of the first stage. The interference removing unit IC of each stage is configured in the similar manner as the interference removing unit of the kth stage of FIG. 9, and therefore, description thereof will not be repeated.

The basic operation of the third embodiment shown in FIGS. 8 and 9 will be described in the following. Equations (1) to (5) described with reference to the reception system as the basic concept of the present invention shown in FIGS. 1 and 2 are also applied to the third embodiment.

First, the user signal output from the interference removing unit $IC_{1k}$ of the kth stage is $Y_{1k}(t)$. Parameter estimator $PE_{1k}$ outputs the reception signal coefficient vector $H_{1k}$ of user k, from user signal $Y_{1k}(t)$ of the user k and the input signal vector $X_{1k}(t)$. Multiplier $MP_{1k}$ multiplies the user signal $Y_{1k}(t)$ by the reception signal coefficient vector $H_{1k}$, and the result is subtracted by adder $AD_{1k}$ from input signal vector $X_{1k}(t)$. The result is used as the input signal vector $X_{1(k+1)}(t)$ to the interference removing unit $IC_{1(k+1)}$ of the next stage. Namely, the following equation is obtained.

$$X_{1(k+1)}(t) = X_1(t) - H_{1k}S_{1k}(t) \quad (9)$$

By substituting the above described equation (3) for equation (9), the following equation (10) results.

$$X_{1(k+1)}(t) = \{H_{1k}Y_{1k}(t) + H_{1(k+1)}Y_{1(k+1)}(t) + \ldots + H_{1m}Y_{1m}(t) + N(t)\} - H_{1k}Y_{1k}(t) = H_{1(k+1)}Y_{1(k+1)}(t) + \ldots + H_{1m}S_{1m}(t) + N(t) \quad (10)$$

As can be understood from the equation (10), the input vector signal $X_{1(k+1)}(t)$ is a vector signal corresponding to the input vector signal $X_{1k}(t)$ of the interference removing unit of the preceding stage with the component of the user signal $Y_{1k}(t)$ (that is, interference signal component for the adaptive array $AA_{1(k+1)}$ of the interference removing unit of the k+1th stage) removed. Therefore, when $X_{1(k+1)}(t)$ rather than $X_{1k}(t)$ is used as the input signal vector for the adaptive array $AA_{1(k+1)}$ of the interference canceller of the k+1th stage, the adaptive array operates better, and as a result, more accurate signal $Y_{1(k+1)}(t)$ of the user (k+1) can be extracted.

In the reception system in accordance with the third embodiment shown in FIGS. 8 and 9, when the user signal extracted by the adaptive array $AA_{1k}$ of each stage (for example, kth stage) of the interference canceller of the first stage includes a demodulation error, error determining unit $ED_{1k}$ generates an L level error determination signal $E_{1k}$ and applies the same to one input of AND gate $AND_{1k}$. Therefore, input of the product of the reception signal coefficient vector $H_{1k}$ and the user signal $Y_{1k}(t)$ output from multiplier $MP_{1k}$, that is, input of replica signal to adder $AD_{1k}$ can be prevented.

As a result, of the processings for subtracting interference wave components performed by adders $AD_{11}, \ldots, AD_{1k}, \ldots, AD_{1m}$ of respective stages, subtraction of the extracted user signal with an error is excluded, and therefore, such an error is not reflected (for example, an impulse-like noise is not generated) in the result of subtraction at each stage. Therefore, the influence of the demodulation error on the user signal output from each stage can be prevented.

As described above, in the interference canceller of the first stage including a series connection of interference removing units $IC_{11}, \ldots, IC_{1m}$, at the interference removing unit where it is determined that there is an error, removal of the interfering wave is stopped. Therefore, from the view point of removing interference wave component, it may be insufficient. It is noted, however, that when the user signal including a demodulation error is once subtracted, the user output signals of all the succeeding stages are affected, providing an inaccurate output signal. In view of such a drawback, the interference canceller including k stages of interference removing units in the longitudinal direction is considered sufficiently effective, in that it ensures validity of the output user signal, though removal of the interference wave component is somewhat insufficient.

In the third embodiment shown in FIG. 8, however, in order to further promote removal of the interfering wave component, the series connection of interference removing units $IC_{11}, \ldots, IC_{1m}$ of longitudinal k stages form a first stage interference canceller, and a plurality of such first stage interference cancellers are connected in the lateral direction, so that an interference canceller of multiple stages as a whole is provided. This enables further removal of the interference wave component for the processing of the succeeding stages.

More specifically, an error determination signal output from each stage of any one of a plurality of users 1 to m, for example, an error determination signal $E_{11}$ output from interference removing unit $IC_{11}$ of the first stage in the longitudinal direction is applied to an input of the gate unit $GE_{21}$ of the first stage of the next stage interference canceller adjacent in the lateral direction, as well as to selective control inputs of gate units $GF_{21}$ and $GG_{21}$. Further, the user signal $Y_{11}(t)$ output from interference removing unit $IC_{11}$ is also applied to the input of gate unit $GE_{21}$.

The input signal vector $X_{21}(t)$ from interference removing unit $IC_{1m}$ of the last stage of the first stage interference canceller is also applied to the input of gate unit $GE_{21}$.

When error determination signal $E_{11}$ indicates that there is no demodulation error at the interference removing unit $IC_{11}$, gate unit $GE_{21}$ passes the error determination signal $E_{11}$ itself and the user signal $Y_{11}(t)$ as they are and apply these signals to the input of gate unit $GF_{21}$, and applies the input signal vector $X_{21}(t)$ to the input of gate unit $GG_{21}$, in accordance with the input error determination signal $E_{11}$.

When the error determination signal $E_{11}$ indicates that there is a demodulation error at interference removing unit $EC_{11}$, gate unit $GE_{21}$ applies the input signal vector $X_{21}(t)$ to the input of interference removing unit $IC_{21}$, in accordance with the input error determination signal $E_{11}$.

Interference removing unit $IC_{21}$ has the same configuration as the interference removing unit $IC_{1k}$ shown in FIG. 9, which applies the calculated error determination signal $E_{21}$ and the user signal $Y_{21}(t)$ to the input of gate unit $GF_{21}$, and applies the input signal vector $X_{22}(t)$ to the input of gate unit $GG_{21}$.

When error determination signal $E_{11}$ represents absence of any error, gate unit $GF_{21}$ selects the error determination signal $E_{11}$ and a user signal $Y_{11}(t)$ that have passed through gate unit $GE_{21}$ from the interference removing unit $IC_{11}$ of the preceding stage, and outputs these as error determination signal $E_{21}$ and the user signal $Y_{21}(t)$, respectively.

When error determination signal $E_{11}$ represents presence of an error, gate unit $GF_{21}$ selects the error determination signal $E_{21}$ and the user signal $Y_{21}(t)$ newly calculated by interference removing unit $IC_{21}$ and outputs these as they are.

When the error determination signal $E_{11}$ represents absence of any error, gate unit $GG_{21}$ selects the input signal vector $X_{21}(t)$ that has passed through gate unit $GE_{21}$ from interference removing unit $IC_{1m}$, and applies the same to the input of gate unit $GE_{22}$ of the succeeding stage.

When error determination signal $E_{11}$ represents presence of an error, gate unit $GG_{21}$ selects the input signal vector $X_{22}(t)$ newly calculated by interference removing unit $IC_{21}$, and applies the same to the input of gate unit $GE_{22}$ of the succeeding stage.

More specifically, when it is once determined by the interference removing unit $IC_{11}$ of the preceding stage interference canceller that there is no error, the error determination signal $E_{11}$ and the user signal $Y_{11}(t)$ calculated by the interference removing unit $IC_{11}$ are passed as they are through the interference cancellers connected in a plurality of stages in the lateral direction, and output as final outputs from the gate GF (not shown) of the interference canceller of the last stage. Further, the input signal vector $X_{21}(t)$ from the preceding stage is directly applied to the input of gate unit $GG_{21}$, not through the interference removing unit $IC_{21}$.

When it is determined by the interference removing unit $IC_{11}$ of the preceding stage interference canceller that there is an error, it follows that the input signal vector $X_{21}(t)$ input to the interference removing unit $IC_{21}$ still includes the interference component of user 1, as subtraction of the replica signal corresponding to user 1 from the input signal vector is inhibited in the interference removing unit $IC_{11}$. Therefore, interference removing unit $IC_{21}$ newly performs removal of the interference wave component of user 1, based on the input signal vector $X_{21}(t)$ from which the interference wave component has been already removed for the error-free users. The operation of interference removing unit $IC_{21}$ is as already described with reference to FIG. 9.

The user signal $Y_{21}(t)$ and the error determination signal $E_{21}$ representing presence/absence of a demodulation error at the interference removing unit $IC_{21}$ output from the first stage interference removing unit $IC_{21}$ corresponding to user 1 are applied through gate unit $GF_{21}$ to the input of gate unit GE (not shown) of the interference canceller of the next stage. Dependent on the presence/absence of the error at the preceding stage interference removing unit $IC_{11}$, the input signal vector $X_{22}(t)$ newly calculated by interference removing unit $IC_{21}$ or the input signal vector $X_{21}(t)$ directly output from the preceding stage interference removing unit $IC_{1m}$ through gate unit $GE_{21}$ is applied to the gate unit $GE_{22}$ of the succeeding stage. The input signal vector $X_{22}(t)$ is applied to interference removing unit $IC_{22}$ or further passed to the next stage through gate unit $GG_{22}$ without passing through interference removing unit $IC_{22}$, depending on presence/absence of the error at the interference removing unit $IC_{12}$.

The configuration and the operation of the second stage corresponding to user 2 are the same as the configuration and the operation of the first stage corresponding to user 1 described above.

Thus, according to the third embodiment of the present invention, an interference canceller is formed by m stages of interference removing units corresponding to users 1 to m connected in series in the longitudinal direction and a plurality of stage of such carriers are provided in the lateral direction, so that the interference wave component can further be removed.

Fourth Embodiment

Figure 10:
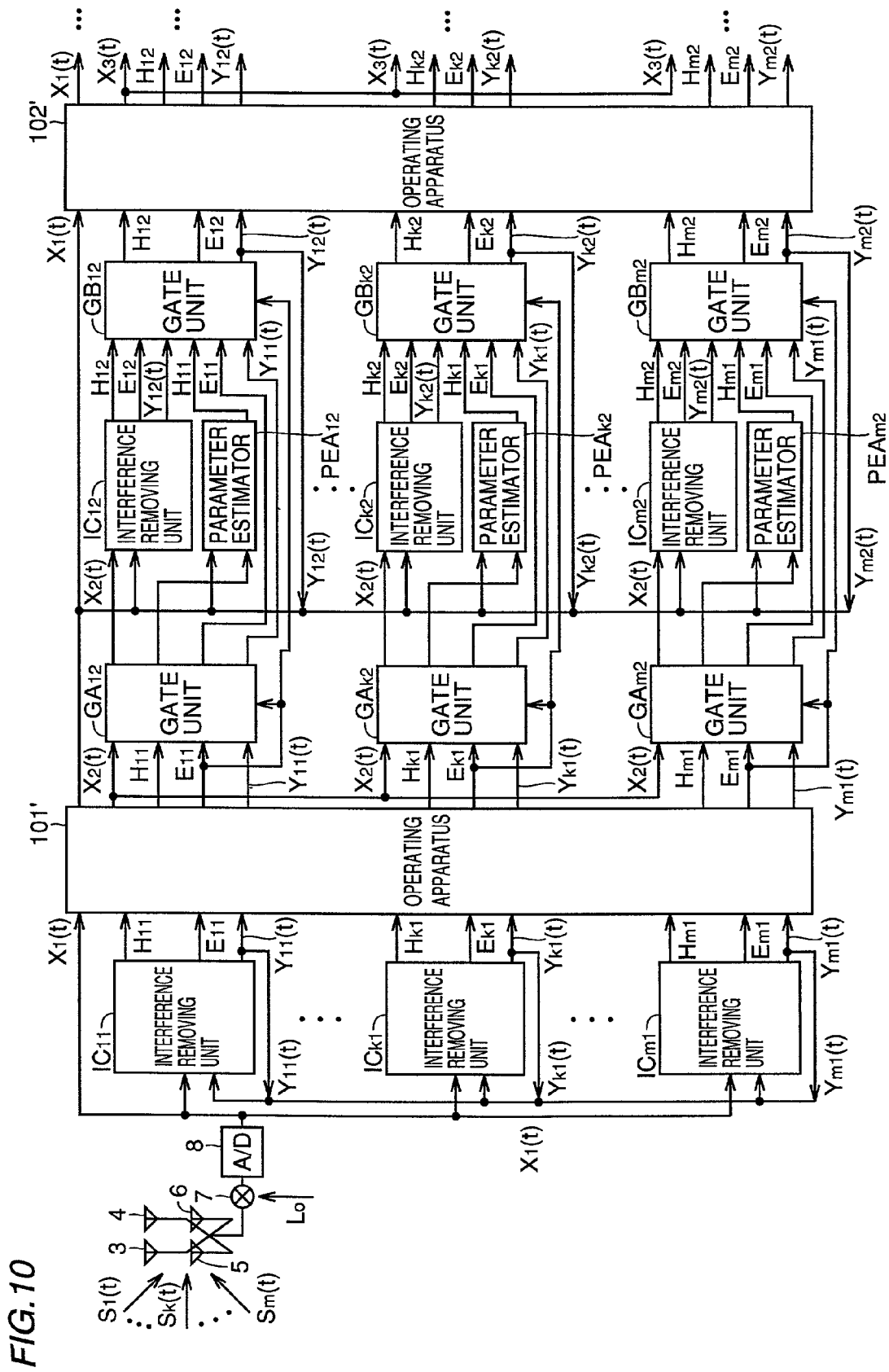
FIG. 10 is a block diagram of the reception system for the PDMA base station in accordance with a fourth embodiment of the present invention.

FIG. 10 is a block diagram representing the reception system for the PDMA base station in accordance with the fourth embodiment of the present invention. The configuration of the reception system shown in FIG. 10 is the same as the reception system in accordance with the first embodiment shown in FIG. 3, except for the following points.

In the first embodiment shown in FIG. 3, the user signal that is a complex signal output from the re-modulator (FIG. 4) included in each interference removing unit IC is applied only to the parameter estimator (FIG. 4) included in that interference removing unit, and not applied to the parameter estimators of the interference removing units of other users.

In the fourth embodiment shown in FIG. 10, the user signal output from the re-modulator of the interference removing unit of each user is applied not only to the user of interest but also to the parameter estimators of interference removing units of all other users.

As described with reference to the reception system as a basic concept for the present invention shown in FIG. 1, when the reception signal coefficient vector is estimated without taking into consideration the correlation value between the user signal of a user of interest and the user signals of other users (assuming that the correlation value is 0), it may cause an error in the output signal.

In the fourth embodiment shown in FIG. 10, the reception signal coefficient vector of each user is estimated, taking into consideration the correlation value among a plurality of user signals. The method of calculation will be described in the following.

For example, it is assumed that the reception signal $X_1(t)$ is defined in the following manner, by the signals $Y_{11}(t)$, $Y_{21}(t)$, $Y_{31}(t)$, $Y_{41}(t)$ of four users and the reception signal coefficient vectors $H_{11}$, $H_{21}$, $H_{31}$ and $H_{41}$.

$$X_1(t)=(H_{11}*Y_{11}(t))+(H_{21}*Y_{21}(t))+(H_{31}*Y_{31}(t))+(H_{41}*Y_{41}(t)) \quad (11)$$

where n represents a noise component.

Here, when an ensemble average between the user signal $Y_{11}(t)$ of user 1 and a reception signal $X_1(t)$ is calculated, the equation (11) can be developed in the following manner. Here, "*" as a suffix represents a complex conjugate.

$$E[X_1(t)*Y_{11}*(t)]=H_{11}*E[Y_{11}(t)*Y_{11}*(t)]+H_{21}*E[Y_{21}(t)*Y_{11}*(t)]+H_{31}*E[Y_{31}(t)*Y_{11}*(t)]+H_{41}*E[Y_{41}(t)*Y_{11}*(t)]+E[n*Y_{11}*(t)] \quad (12)$$

Here, $E[Y_{11}(t)*Y_{11}*(t)]=1$, $[n*Y_{11}*(t)]=0$, and therefore, equation (12) can be represented as $$E[X_1(t)*Y_{11}*(t)]=H_{11}+H_{21}*E[Y_{21}(t)*Y_{11}*(t)]+H_{31}*E[Y_{31}(t)*Y_{11}*(t)]+H_{41}*E[Y_{41}(t)*Y_{11}*(t)] \quad (13)$$

In the reception system as a basic concept for the present invention shown in FIGS. 1 and 2, the correlation values $E[Y_{21}(t)*Y_{11}*(t)]$, $E[Y_{31}(t)*Y_{11}*(t)]$ and $E[Y_{41}(t)*Y_{11}*(t)]$ among the user signals, which are correlated in the actual propagation environment, have been assumed to 0. Therefore, the resulting value $E[X_1(t)*Y_{11}*(t)]$ $H_{11}$ includes an error. In the fourth embodiment, the correlation values among the users (ensemble average) are actually calculated, and then, the reception signal coefficient vectors $H_{11}$, $H_{21}$, $H_{31}$ and $H_{41}$ are calculated. The following calculation is executed by parameter estimators $PE_{11}, \ldots, PE_{k1}, \ldots, PE_{m1}$ at the interference removing units $IC_{11}, \ldots, IC_{k1}, \ldots, IC_{m1}$ of the preceding stage, for example.

More specifically, when the reception signal coefficient vectors $H_{11}$, $H_{21}$, $H_{31}$ and $H_{41}$ are considered as unknown numbers, simultaneous equations including four equations are necessary to calculate these values. Therefore, in addition to the aforementioned value $E[X_1(t)*Y_{11}*(t)]$, three ensemble averages, that is, $E[X_1(t)*Y_{21}*(t)]$, $E[X_1(t)*Y_{31}*(t)]$ and $E[X_1(t)*Y_{41}*(t)]$ are actually calculated.

By actually calculating individual correlation values (ensemble averages) between the user signals and inputting as substitution to the result of development of the aforementioned three ensemble averages, simultaneous equations where unknown numbers are $H_{11}$, $H_{21}$, $H_{31}$ and $H_{41}$ are obtained. By solving the equations, it is possible to estimate with high precision, the reception signal coefficient vectors $H_{11}$, $H_{21}$, $H_{31}$ and $H_{41}$ which are close to the actual propagation environment. In the interference canceller of the next stage, the correlation values among user signals are actually calculated in the similar manner and the reception signal coefficient vector is estimated.

In the interference canceller of each stage, even when it is determined by the interference removing unit of the preceding stage that there is no error and the replica signal has been already subtracted once, the replica signal is again subtracted from the initial input signal vector, and hence, in order to improve accuracy of removal, parameter estimators $PEA_{12}, \ldots, PEA_{k2}, \ldots, PEA_{m2}$ are provided separately.

Particularly, in the fourth embodiment, regardless of the result of determination as to the demodulation error in the extracted signal by the error determining unit, individual correlation value (ensemble average) between every user is actually calculated and used. Therefore, it is possible that there is a demodulation error for any user. When the correlation value between a signal with an error and a signal without an error is close to the correlation value of the actual signals (error-free signal and error-free signal), however, the reception signal coefficient vector that is close to the actual propagation environment can be estimated.

As described above, according to the fourth embodiment of the present invention, the correlation value between user signals that has been regarded as 0 is actually calculated, and therefore, a reception signal coefficient vector without any error can be estimated.

Fifth Embodiment

Figure 11:
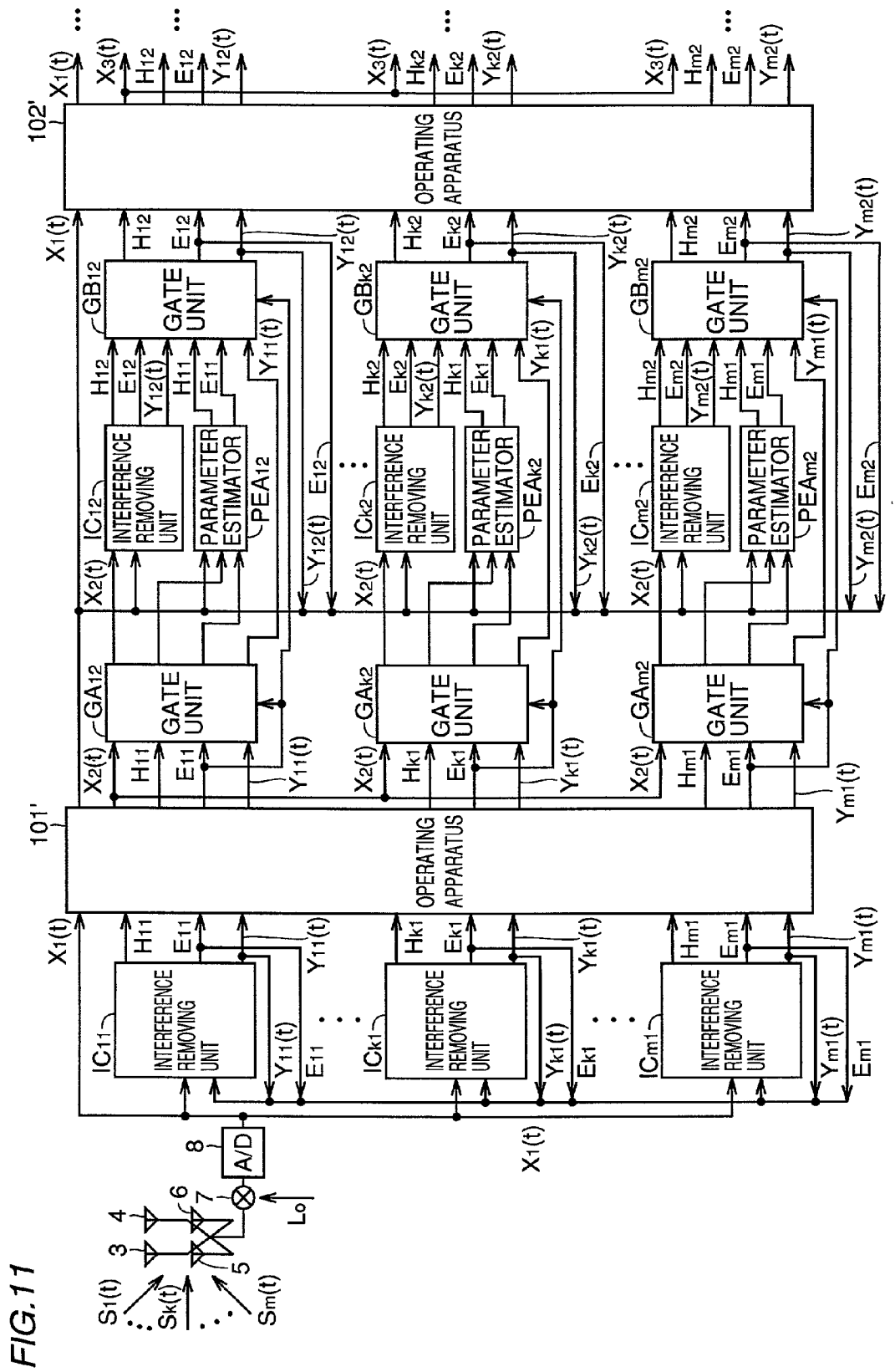
FIG. 11 is a block diagram of the reception system for the PDMA base station in accordance with a fifth embodiment of the present invention.

FIG. 11 is a block diagram representing the reception system for the PDMA base station in accordance with the fifth embodiment of the present invention. The configuration of the reception system shown in FIG. 11 is the same as that of the reception system in accordance with the fourth embodiment shown in FIG. 10, except for the following point.

More specifically, in addition to the configuration of the fourth embodiment shown in FIG. 10, in FIG. 11, the system is configured such that the error determination signal of the error determining unit of each user is applied to the parameter estimators of the interference removing units of all the users. As a result, it becomes possible to determine whether the correlation value between signals is to be calculated or not, dependent on the presence/absence of the demodulation error.

More specifically, description will be given using the example of the fourth embodiment described above. Assume that it is determined that there is no demodulation error in the extracted signals of users 1 and 2 while there is demodulation error in the extracted signals of users 3 and 4, among the four users. As to the signal of the user with an error, the user signal is to be newly extracted by the interference canceller of the next stage.

Therefore, in the fifth embodiment, only the correlation between the signals of users 1 and 2 free of any error is used, and the correlation with the signals of users 3 and 4 with errors is regarded as 0. For example, in the equation (13), among the correlation values, $E[Y_{31}(t)*Y_{11}*(t)]$ and $E[Y_{41}(t)*Y_{11}*(t)]$ are regarded as 0. Therefore, the equation (13) can be represented as follows.

$E[X_1(t)*Y_{11}*(t)]=H_{11}+H_{21}*E[Y_{21}(t)*Y_{11}*(t)]$ In this equation, there are two unknown numbers, that is, $H_{11}$ and $H_{21}$. Therefore, in addition to the value $E[X_1(t)*Y_{11}*(t)]$, also the value $E[X_1(t)*Y_{21}*(t)]$ is calculated. The correlation value $E[Y_{21}(t)*Y_{11}*(t)]$ of users 1 and 2 is calculated and input to development equations of both $E[X_1(t)*Y_{11}*(t)]$ and $E[X_1(t)*Y_{21}*(t)]$, then simultaneous equations in which unknown numbers are $H_{11}$ and $H_{21}$ are obtained. By solving the simultaneous equations, the reception signal coefficient vectors $H_{11}$ and $H_{21}$ can be calculated with high precision.

Particularly, in the fifth embodiment, the correlation value between user signals free of any error is actually calculated and utilized, and therefore, a reception signal coefficient vector closer to the actual propagation environment can be estimated.

Sixth Embodiment

Figure 12:
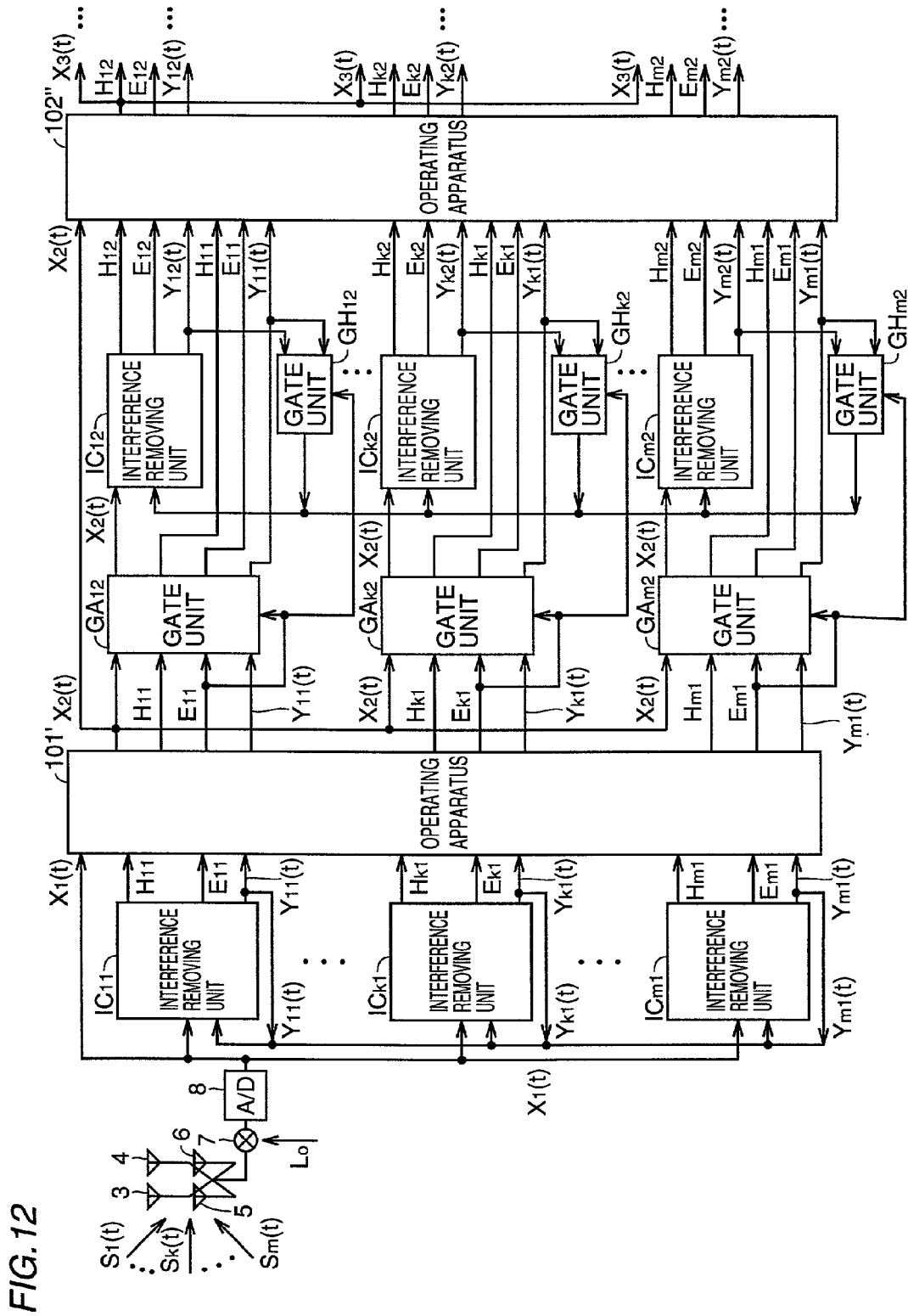
FIG. 12 is a block diagram of the reception system for the PDMA base station in accordance with a sixth embodiment of the present invention.

FIG. 12 is a block diagram representing the reception system for the PDMA base station in accordance with the sixth embodiment of the present invention. The configuration of the reception system shown in FIG. 12 is the same as that of the reception system in accordance with the second embodiment shown in FIG. 6, except the following point.

More specifically, in the second embodiment shown in FIG. 6, the user signal that is a complex signal output from the re-modulator included in each interference removing unit IC is applied only to the parameter estimator that is included in that interference removing unit, and not applied to the parameter estimators of interference removing units of other users. In the sixth embodiment shown in FIG. 12, similar to the fourth embodiment shown in FIG. 10, the user signal output from the re-modulator of the interference removing unit of each user is applied to the parameter estimators of the interference removing units of all other users, in addition to the user of interest.

The reception system in accordance with the sixth embodiment shown in FIG. 12 differs from the reception system in accordance with the fourth embodiment shown in FIG. 10, in the following point.

In the configuration of the sixth embodiment shown in FIG. 12, the replica signal of the user newly determined to be free of any error is subtracted not from the initial input signal vector $X_1(t)$ but from the input signal vector calculated by the operating apparatus of the corresponding interference canceller. More specifically, subtraction of the replica signal is not repeated for the user that has already been determined to be free of any error by the interference canceling unit of the preceding stage, and it becomes unnecessary to add parameter estimating units $PEA_{12}, \ldots, PEA_{k2}, \ldots, PEA_{m2}$ as in the fourth embodiment shown in FIG. 10.

Rather, gate units $GH_{12}, \ldots, GH_{k2}, \ldots, GH_{m2}$ are provided, which select, dependent on presence/absence of an error at the interference removing unit of the preceding stage, either the user signal newly calculated by the interference removing unit of the corresponding interference canceller or the user signal that has been already calculated by the interference removing unit of the preceding stage to be an object of correlation value calculation.

As described above, according to the sixth embodiment of the present invention, the correlation value between the user signals that has been regarded as 0 is actually calculated, and therefore, as in the fourth embodiment, it becomes possible to estimate the reception signal coefficient vector free of any error.

Seventh Embodiment

Figure 13:
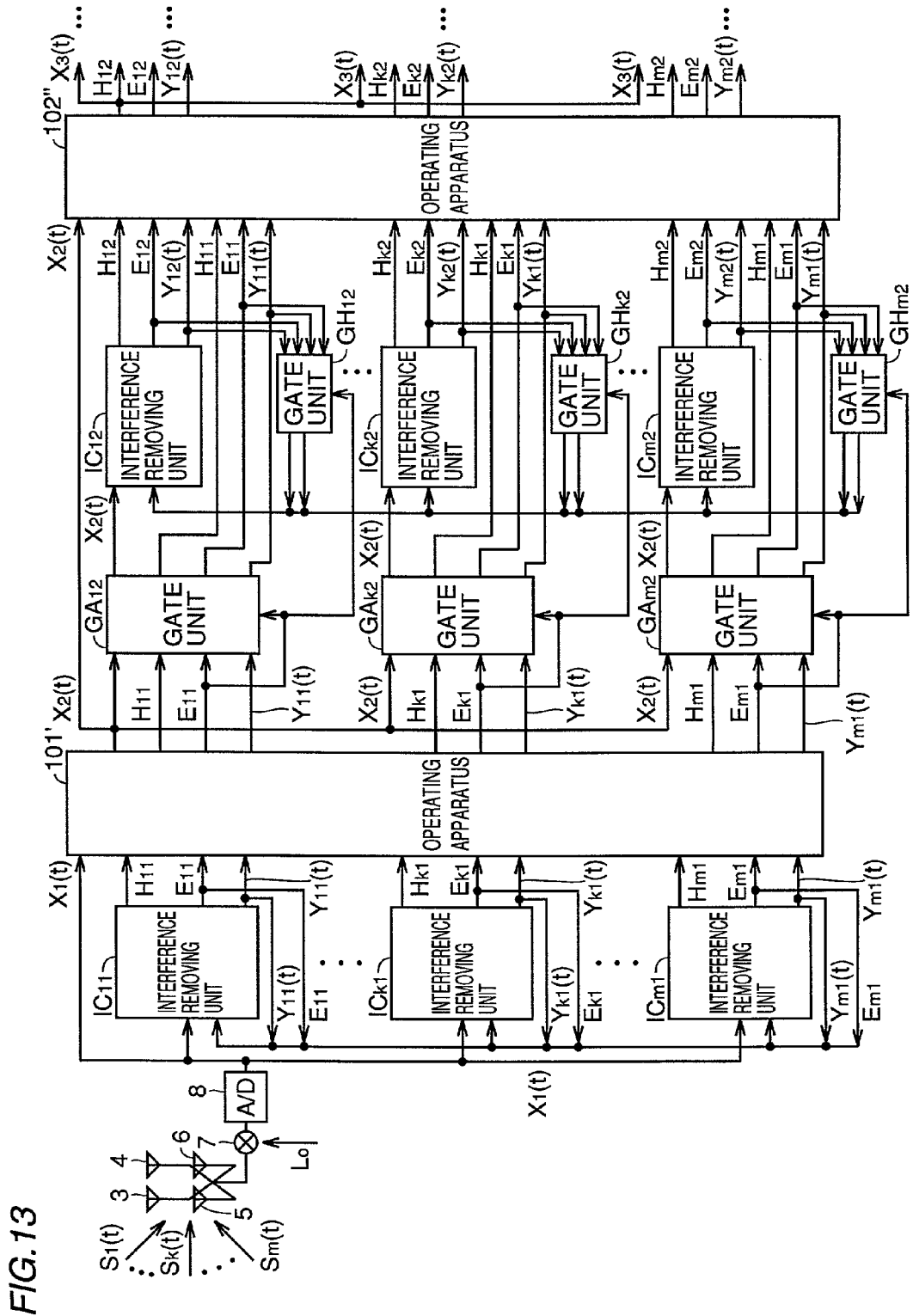
FIG. 13 is a block diagram of the reception system for the PDMA base station in accordance with a seventh embodiment of the present invention.

FIG. 13 is a block diagram representing the reception system for the PDMA base station in accordance with the seventh embodiment of the present invention. The configuration of the reception system shown in FIG. 13 is the same as that of the reception system in accordance with the sixth embodiment shown in FIG. 12, except for the following point.

More specifically, in addition to the configuration of the sixth embodiment shown in FIG. 12, in the configuration of FIG. 13, the error determination signal of the error determining unit for each user is applied to the parameter estimators of the interference removing units of all the users. As a result, dependent on presence/absence of a demodulation error, it becomes possible to determine whether the correlation value between signals is to be calculated or not.

Namely, in the seventh embodiment, as in the fifth embodiment, the correlation value between user signals that are free of any error is actually calculated and utilized, whereby it becomes possible to estimate the reception signal coefficient vector closer to the actual propagation environment.

Eighth Embodiment

Figure 14:
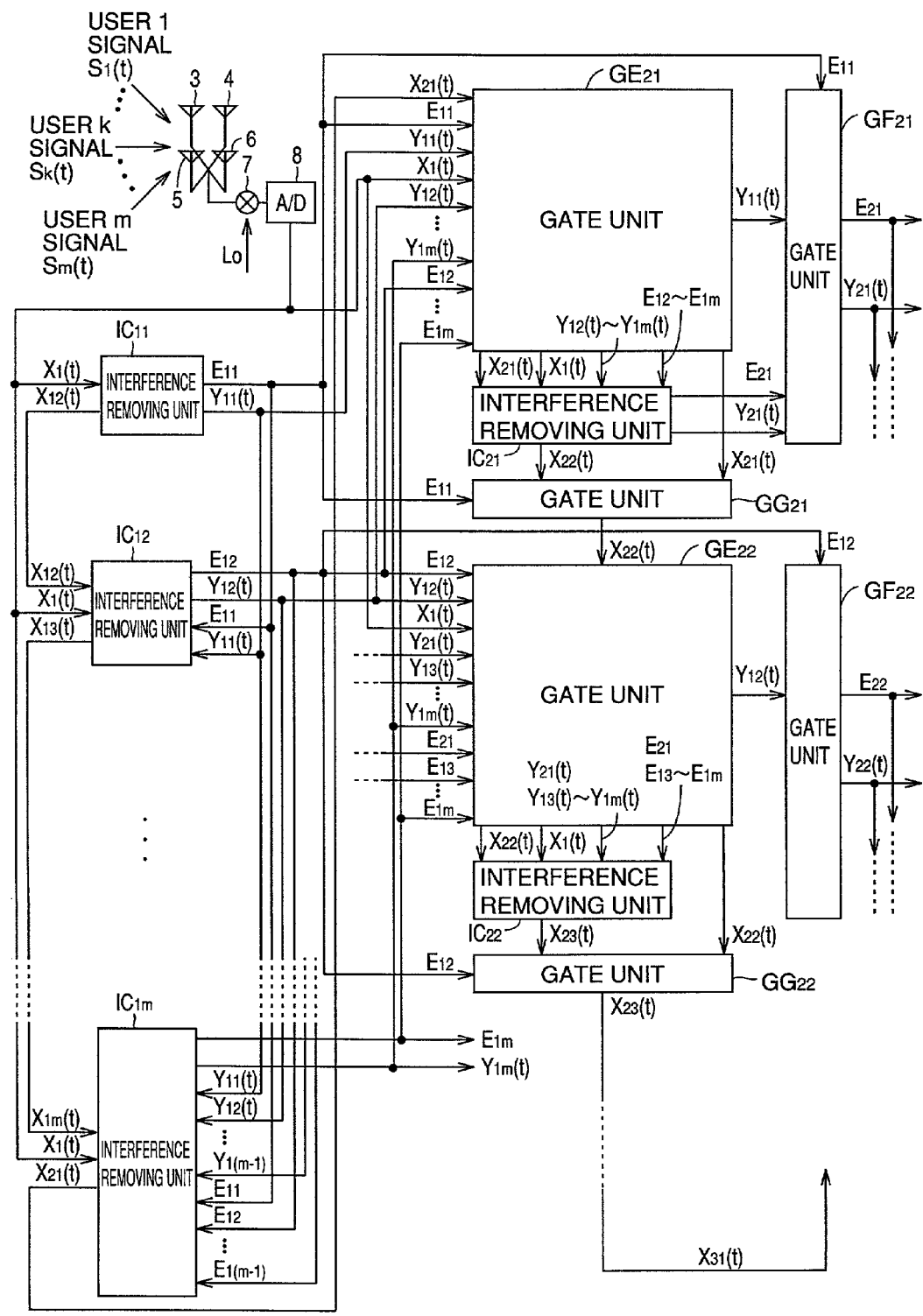
FIG. 14 is a block diagram of the reception system for the PDMA base station in accordance with the eighth and ninth embodiments of the present invention.

FIG. 14 is a block diagram representing the reception system for the PDMA base station in accordance with the eighth embodiment of the present invention. Basically, the reception system in accordance with the eighth embodiment corresponds to the configuration of the reception system in accordance with the third embodiment shown in FIG. 8, to which the technique described with respect to the fourth embodiment shown in FIG. 10 is applied.

More specifically, in the third embodiment shown in FIG. 8, the user signal that is a complex signal output from the re-modulator (FIG. 9) included in each interference removing unit is applied only to the parameter estimator of the corresponding interference removing unit and not applied to the parameter estimators of the interference removing units of other users. In the eighth embodiment shown in FIG. 14, the user signal output from the re-modulator of each user is applied to the parameter estimators of the interference removing units of the users of the next and the following stages, in addition to the corresponding user.

More specifically, in the eighth embodiment shown in FIG. 14, it is considered that the initial input signal vector $X_1(t)$ is commonly input to respective interference removing units IC, and applied to the positive input of adder AD and the parameter estimator PE of each interference calculating unit IC, as will be described later. The input signal vector output from the interference removing unit of the preceding stage is applied to the adaptive array AA of the corresponding interference removing unit (in the interference removing unit $IC_{11}$ of the first stage, the initial input signal vector $X_1(t)$ is applied to adaptive array $AA_{11}$).

In the interference removing unit $IC_{11}$ of the first stage interference canceller, parameter is estimated by applying the user signal $Y_{11}(t)$ generated by the corresponding interference removing unit to parameter estimator $PE_{1k}$ as shown in FIG. 9, and user signals of other users are not used.

In the interference removing unit $IC_{12}$ of the succeeding stage, however, in addition to the user signal $Y_{12}(t)$ generated by the corresponding interference removing unit, the user signal $Y_{11}(t)$ generated by the interference removing unit $IC_{11}$ of the preceding stage is also used for parameter estimation.

Similarly, the interference removing unit of each stage performs parameter estimation using, in addition to the user signal generated by that interference removing unit, the user signal from the interference removing unit preceding to that interference removing unit.

For example, the interference removing unit $IC_{1m}$ of the lowest stage of the first stage interference canceller performs parameter estimation using, in addition to the user signal $Y_{1m}(t)$ generated in that interference removing unit, the user signals $Y_{11}(t), \ldots, Y_{1(m-1)}(t)$ generated by the interference removing units $IC_{11}, \ldots, IC_{1(m-1)}$ of the preceding stage.

Figure 15:
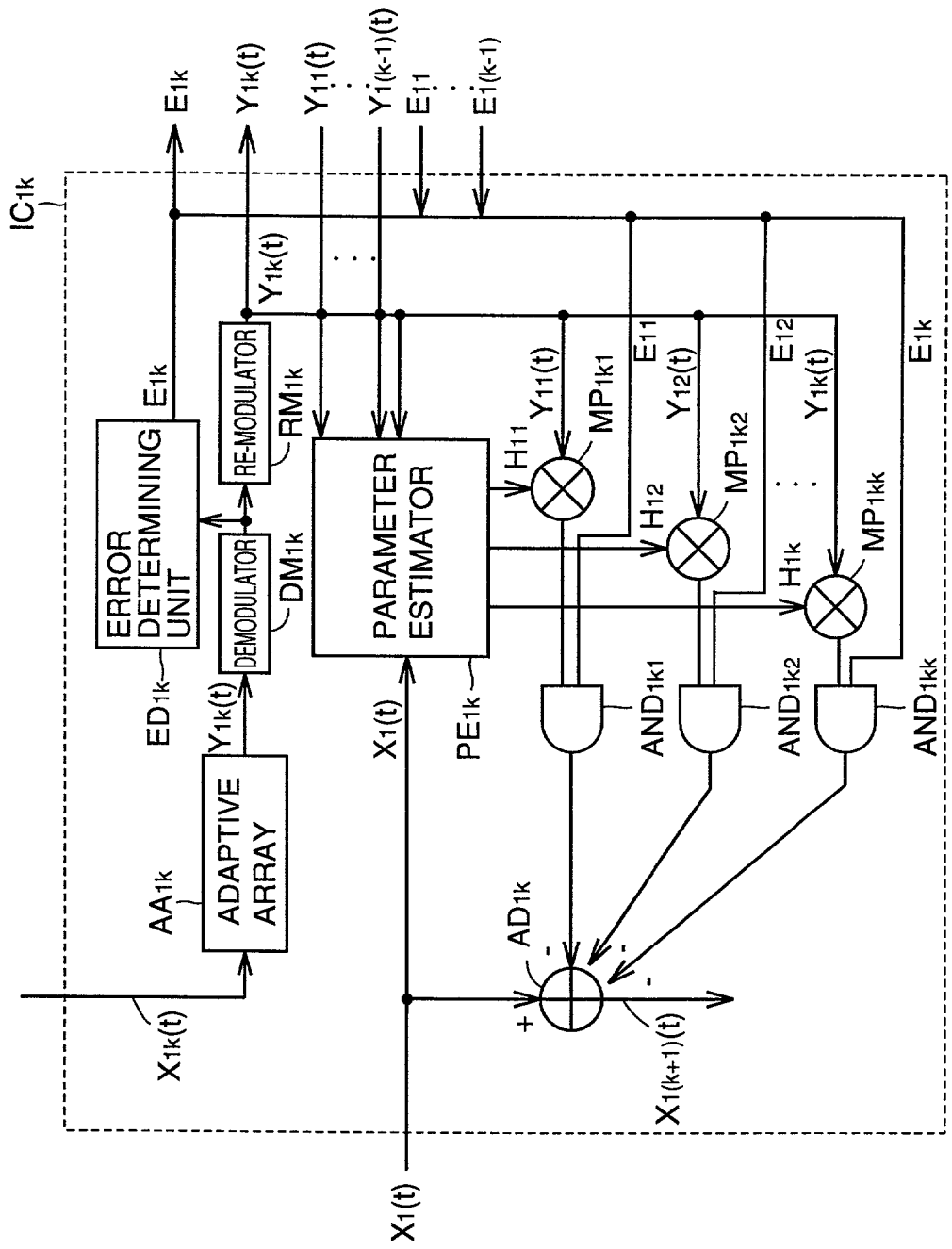
FIG. 15 is a block diagram representing a configuration of the interference removing unit of the reception system for the PDMA base station in accordance with the eighth embodiment of the present invention.

FIG. 15 is a block diagram representing a configuration of the interference removing unit $IC_{1k}$ of the kth stage of the first stage interference canceller, as an example of the interference removing unit shown in FIG. 14. The interference removing unit shown in FIG. 15 differs from the interference removing unit shown in FIG. 9 in the following point.

More specifically, the input signal vector $X_{1k}(t)$ output from the interference removing unit of the preceding stage is applied only to the adaptive array $AA_{1k}$, and the initial input signal $X_{1k}(t)$ is applied to the input of parameter estimator $PE_{1k}$ and the positive input of adder $AD_{1k}$. To the parameter estimator $PE_{1k}$, the user signal $Y_{1k}(t)$ generated by that interference removing unit and, in addition, user signals $Y_{11}(t), \ldots, Y_{1(k-1)}(t)$ from interference removing units $IC_{11}, \ldots, IC_{1(k-1)}$ of the preceding stage are applied, and based on the correlation values among these user signals, parameter estimator $PE_{1k}$ calculates reception signal coefficient vectors $H_{11}, H_{12}, \ldots, H_{1k}$.

The user signals $Y_{11}(t), \ldots, Y_{1k}(t)$ and the reception signal coefficient vectors $H_{11}, \ldots, H_{1k}$ are multiplied by corresponding multipliers $MP_{1k1}, MP_{1k2}, \ldots, MP_{1kk}$, and the results of multiplication are applied to the negative inputs of adder $AD_{1k}$ through AND gates $AND_{1k1}, AND_{1k2}, \ldots, AND_{1kk}$, respectively.

To the other input of AND gates $AND_{lk1}, AND_{1k2}, \ldots, AND_{1kk}$, error determination signals $E_{11}, \ldots, E_{1(k-1)}$ from the interference removing units $IC_{11}, \ldots, IC_{1(k-1)}$ of the preceding stages as well as the error determination signal $E_{1k}$ generated by the interference removing unit of interest are input, respectively, and the AND gate that receives as an input the error determination signal indicating presence of an error is closed, so that subtraction from the replica signal including the error from the initial input signal vector $X_1(t)$ is avoided.

As a result, an input signal vector $X_{1(k+1)}(t)$ not including any noise component is output from adder $AD_{1k}$, which is applied to the adaptive array $AA_{1(k+1)}$ of the interference removing unit $IC_{1(k+1)}$ of the next stage.

It is understood that the interference removing units $IC_{21}, IC_{22}, \ldots$ of the interference cancellers of the second and the following stages have the similar configuration.

In summary, in the examples shown in FIGS. 14 and 15, the reception signal coefficient vectors $H_{11}, H_{12}, \ldots, H_{1k}, \ldots, H_{1m}$ of interference removing units $IC_{11}, \ldots, IC_{1m}$ are calculated in the following manner. First, the initial input signal vector $X_1(t)$ is given by the following equation.

$$X_1(t) = H_{11}Y_{11}(t) + \ldots + H_{1k}Y_{1k}(t) + \ldots + H_{1m}Y_{1m}(t)$$

In the configuration of the interference canceller of the first stage shown in FIG. 14, the user signal $Y_{1k}(t)$ can be estimated based on the initial input signal vector $X_1(t)$ by the interference removing unit IC of each stage. Therefore, when an ensemble average between each user signal and the initial input signal vector $X_1(t)$ is calculated, simultaneous equations for calculating the reception signal coefficient vectors $H_{11}, H_{12}, \ldots, H_{1k}, \ldots, H_{1m}$ can be obtained with the correlation value between the users (ensemble average) calculated actually.

Further, the operation of the interference canceller of the next stage is basically the same as the operation described with reference to FIG. 8, except for the following point.

More specifically, to the gate unit $GE_{21}$, user signals $Y_{12}(t), \ldots, Y_{1m}(t)$ and error determination signals $E_{12}, \ldots, E_{1m}$ are applied from the interference removing units $IC_{12}, \ldots, IC_{1m}$ of the preceding stage, and when it is determined that there is an error by interference removing unit $IC_{11}$, the user signals $Y_{12}(t), \ldots, Y_{1m}(t)$ and the error determination signals $E_{12}, \ldots, E_{1m}$ are applied to interference removing unit $IC_{21}$, among which the user signals are used for parameter estimation.

Next, to the gate unit $GE_{22}$, user signals $Y_{13}(t), \ldots, Y_{1m}(t), Y_{21}(t)$ and error determination signals $E_{13}, \ldots, E_{1m}, E_{21}$ are applied from interference removing units $IC_{13}, \ldots, IC_{1m}$ and $IC_{21}$ of the preceding stage, and when it is determined that there is an error by interference removing unit $IC_{12}$, the user signals $Y_{13}(t), \ldots, Y_{1m}(t), Y_{21}(t)$ and the error determination signals $E_{13}, \ldots, E_{1m}, E_{21}$ are applied to interference removing unit $IC_{22}$, among which the user signals are used for parameter estimation. Thereafter, similar operation (parameter estimation) is executed by the interference removing unit of each stage of the interference canceller.

As described above, the reception system in accordance with the eighth embodiment shown in FIG. 14 contemplates to calculate the reception signal coefficient vector of each user, additionally considering the correlation values among a plurality of user signals. Therefore, as in the reception system in accordance with the fourth embodiment described above, by the reception system in accordance with the eighth embodiment, a reception signal coefficient vector closer to that obtained in the actual propagation environment can be estimated with high precision.

Ninth Embodiment

Figure 16:
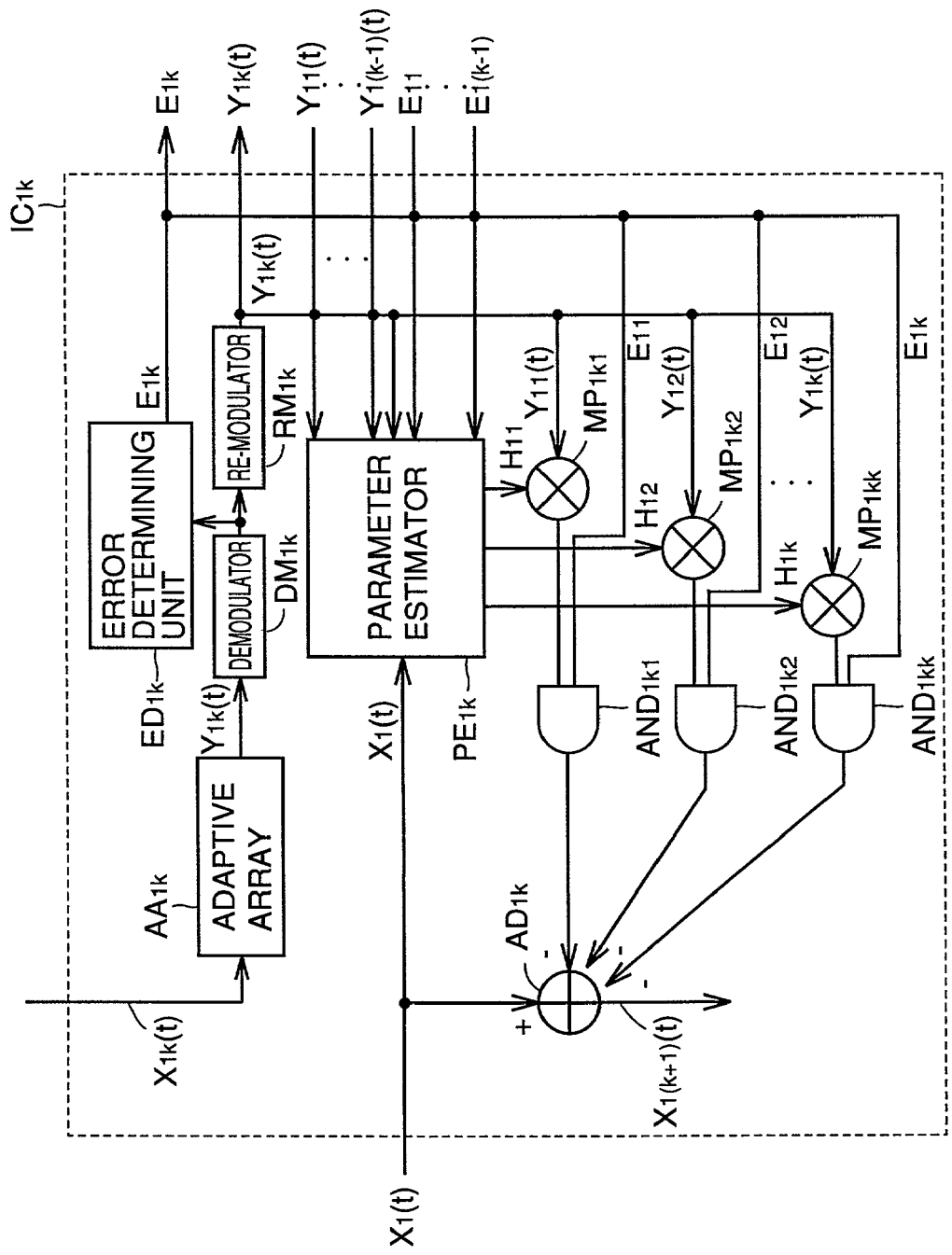
FIG. 16 is a block diagram representing a configuration of the interference removing unit of the reception system for the PDMA base station in accordance with the ninth embodiment of the present invention.

FIG. 16 is a block diagram representing the configuration of the interference removing unit of the reception system for the PDMA base station in accordance with the ninth embodiment of the present invention. Basically, the reception system in accordance with the ninth embodiment has the same overall configuration as the reception system shown in FIG. 14 except for the configuration of the interference removing unit, and it corresponds to the configuration of the reception system in accordance with the third embodiment shown in FIG. 8 to which the technique described with reference to the fifth embodiment shown in FIG. 11 is applied. The interference removing unit shown in FIG. 16 is the same as the interference removing unit in accordance with the eighth embodiment shown in FIG. 15 except for the following point.

More specifically, in addition to the configuration of the interference removing unit in accordance with the eighth embodiment shown in FIG. 15, in the ninth embodiment shown in FIG. 16, the error determination signals (for example, $E_{11}, \ldots, E_{1(k-1)}$) of the error determining units of the interference removing units of the preceding stage are applied to the parameter estimating unit of the interference removing unit of the next stage.

In the reception system in accordance with the ninth embodiment shown in FIG. 16, whether calculation of the correlation value between the signals is to be performed or not is determined dependent on the presence/absence of a demodulation error. Particularly, in the reception system in accordance with the ninth embodiment, the correlation value is calculated only between the user signals that are free of any error to be used for calculating the reception signal coefficient vector. Thus, as in the reception system in accordance with the fifth embodiment described above, it becomes possible to estimate the reception signal coefficient vector closer to the one obtained in the actual propagation environment with high precision.

Tenth Embodiment

The embodiments shown in FIGS. 3 to 16 are directed to the reception system for PDMA base station. Recently, CDMA communication method has been proposed and comes to be practically used, in addition to the PDMA communication method.

In the CDMA communication method, on the transmitting side, the transmitted digital data has it symbol multiplied by a prescribed spreading code so that it is transmitted as a signal with extremely high frequency, and on the receiving side, the received signal is inverse spread using the spreading code, so as to demodulate the data.

Here, when a plurality of different spreading codes not having any correlation with each other are used, it becomes possible to surely separate and extract only the signals of a desired user by performing inverse spreading with the spreading code that corresponds to transmission, even when a plurality of data signals of the same frequency are spread and transmitted. Therefore, use of the CDMA communication method enables further increase of communication capacity. Such CDMA communication method has been already practically used and well known in the field of art, and therefore, detailed description is not given here.

The following embodiment is the application of the radio reception system in accordance with the present invention to the CDMA communication method.

Figure 17:
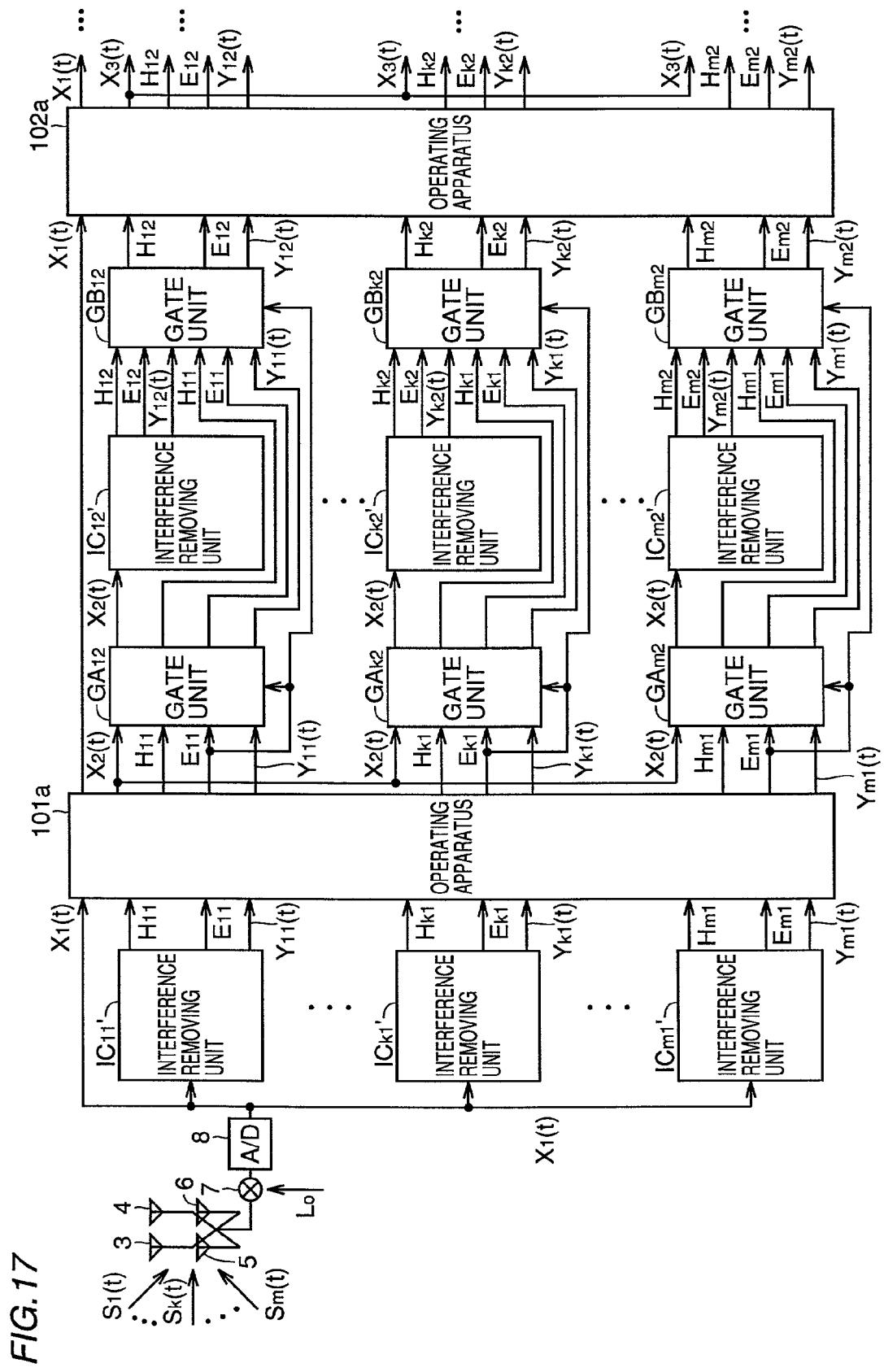
FIG. 17 is a block diagram of the reception system for the CDMA base station in accordance with a tenth embodiment of the present invention.
Figure 18:
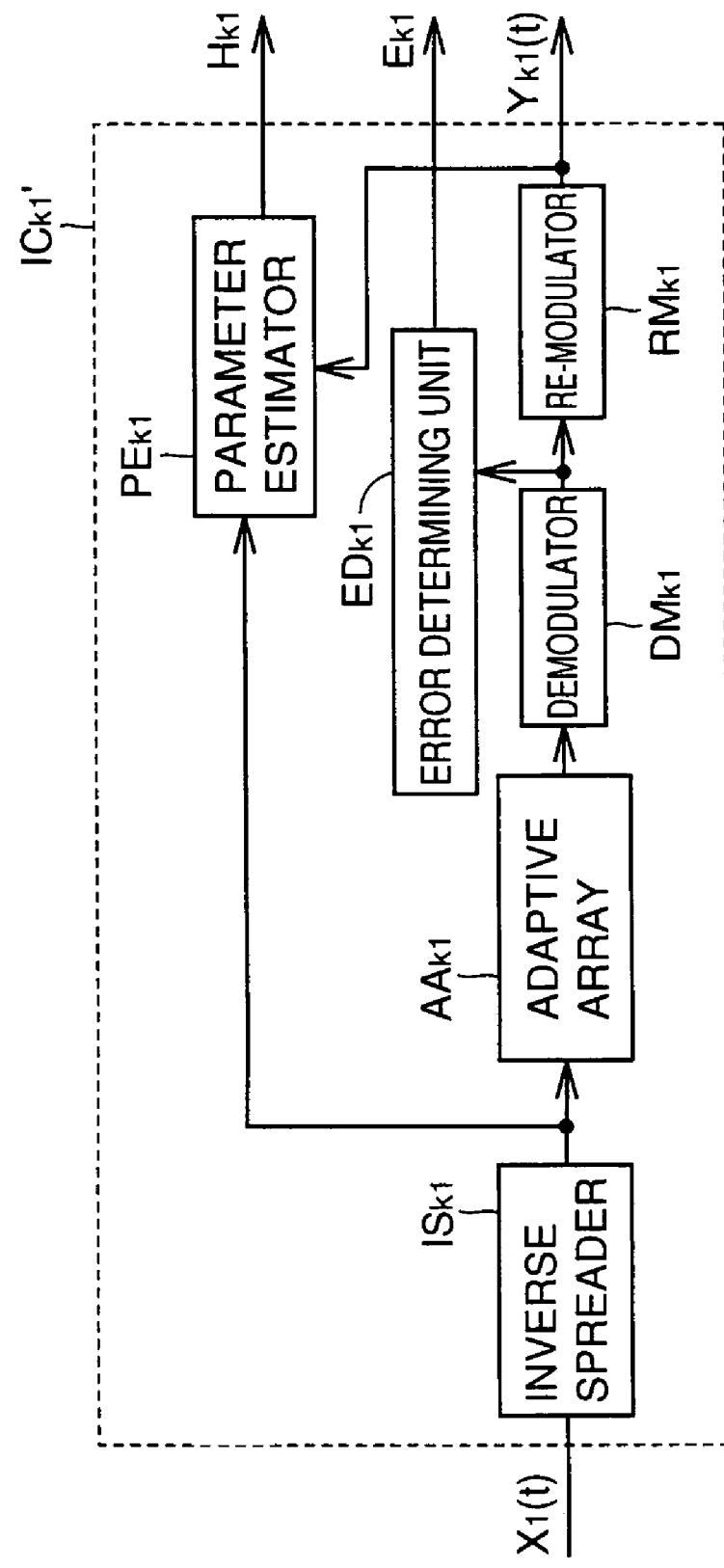
FIG. 18 is a block diagram representing a configuration of the interference removing unit shown in FIG. 17.
Figure 19:
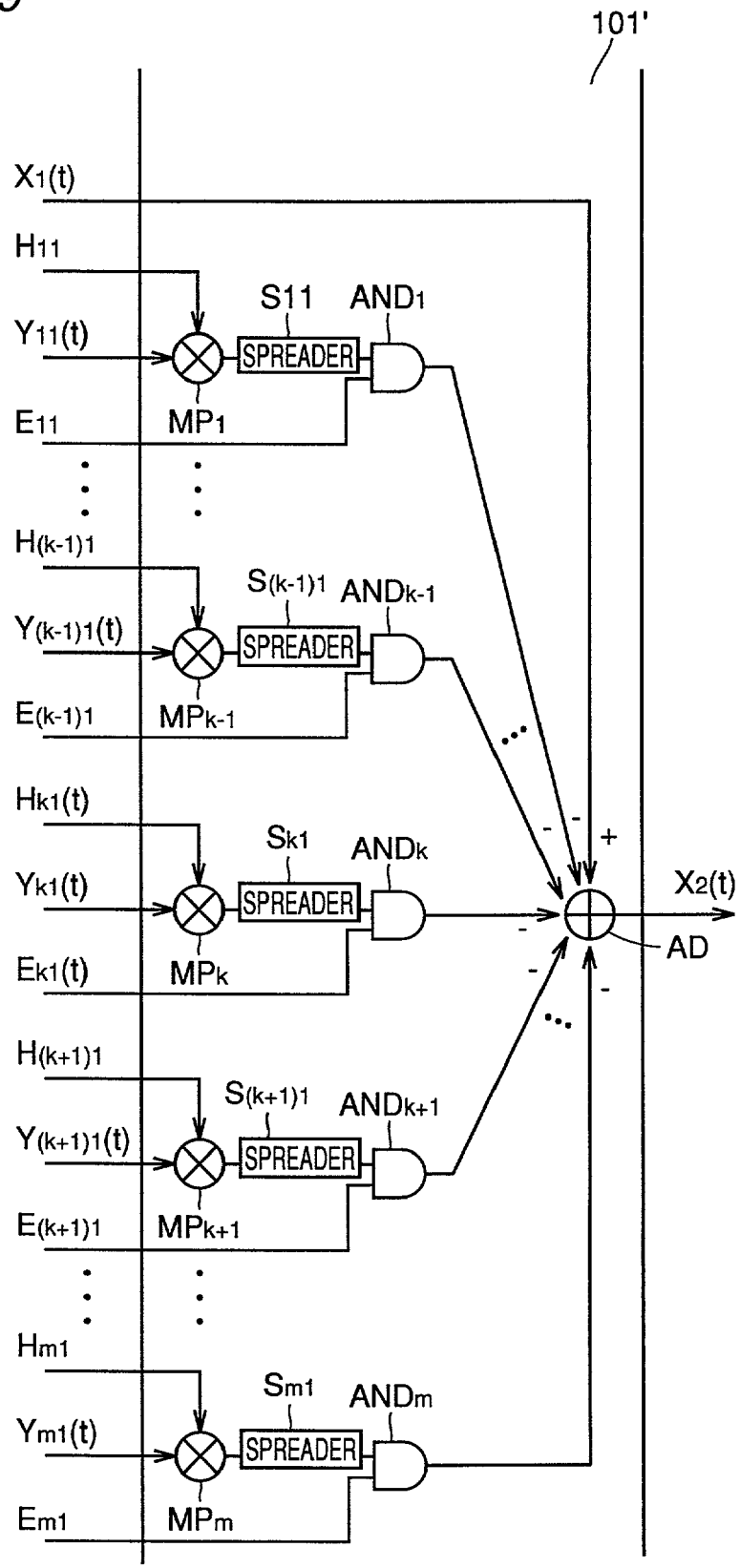
FIG. 19 is a block diagram representing a configuration of the operating apparatus shown in FIG. 17.

FIG. 17 is a block diagram representing the reception system for the CDMA base station in accordance with the tenth embodiment of the present invention. FIGS. 18 and 19 are specific block diagrams of the interference removing unit and the operating apparatus shown in FIG. 17, respectively.

The CDMA reception system in accordance with the tenth embodiment shown in FIGS. 17 to 19 is the same as the PDMA reception system in accordance with the first embodiment shown in FIGS. 3 to 5, except for the following points.

More specifically, the configuration of the interference removing unit IC of the reception system in accordance with the first embodiment shown in FIG. 3 is changed from that of the first embodiment shown in FIG. 4 to the configuration in accordance with the tenth embodiment shown in FIG. 18. In the interference removing unit (as an example, interference removing unit $IC_{k1}'$) shown in FIG. 18, in a preceding stage of the adaptive array and a parameter estimator, there is provided an inverse spreader $IS_{k1}$ for inverse spreading the signals that have been transmitted in accordance with the CDMA communication method and received by antennas 3 to 6. Reception signals that have been inverse spread user by user by the inverse spreader at respective interference removing units are applied to the corresponding adaptive arrays and a parameter estimators, respective user signals are extracted through the same operation as in the first embodiment described above, and the extracted signals are applied to the operating apparatus of the interference canceller of the succeeding stage.

The operating apparatus 101a of the first stage interference canceller shown in FIG. 19 is the same as the operating apparatus 101' shown in FIG. 5, except that spreaders $S_{11}, \ldots$ ..., $S_{(k-1)1}$, $S_{k1}$, $S_{(k+1)1}$, $S_{m1}$, spreading outputs of multipliers $MP_1, \ldots, MP_{k-1}, MP_k, MP_{k+1}, \ldots, MP_m$ are provided.

More specifically, in order to perform subtraction from the input signal vector $X_1(t)$ that has been spread in accordance with the CDMA communication method, the output of each multiplier is spread again by the corresponding spreading code.

Then, the output of each spreader, that is, the output of operating apparatus 101a is again inverse spread by the inverse spreader of the corresponding interference removing unit of the succeeding stage, and applied to the adaptive array and a parameter estimator.

The operating apparatus 102a of the second stage interference canceller has the same configuration as the operating apparatus 101a shown in FIG. 19. Other operations are the same as those of the first embodiment shown in FIGS. 3 to 5.

Eleventh Embodiment

Figure 20:
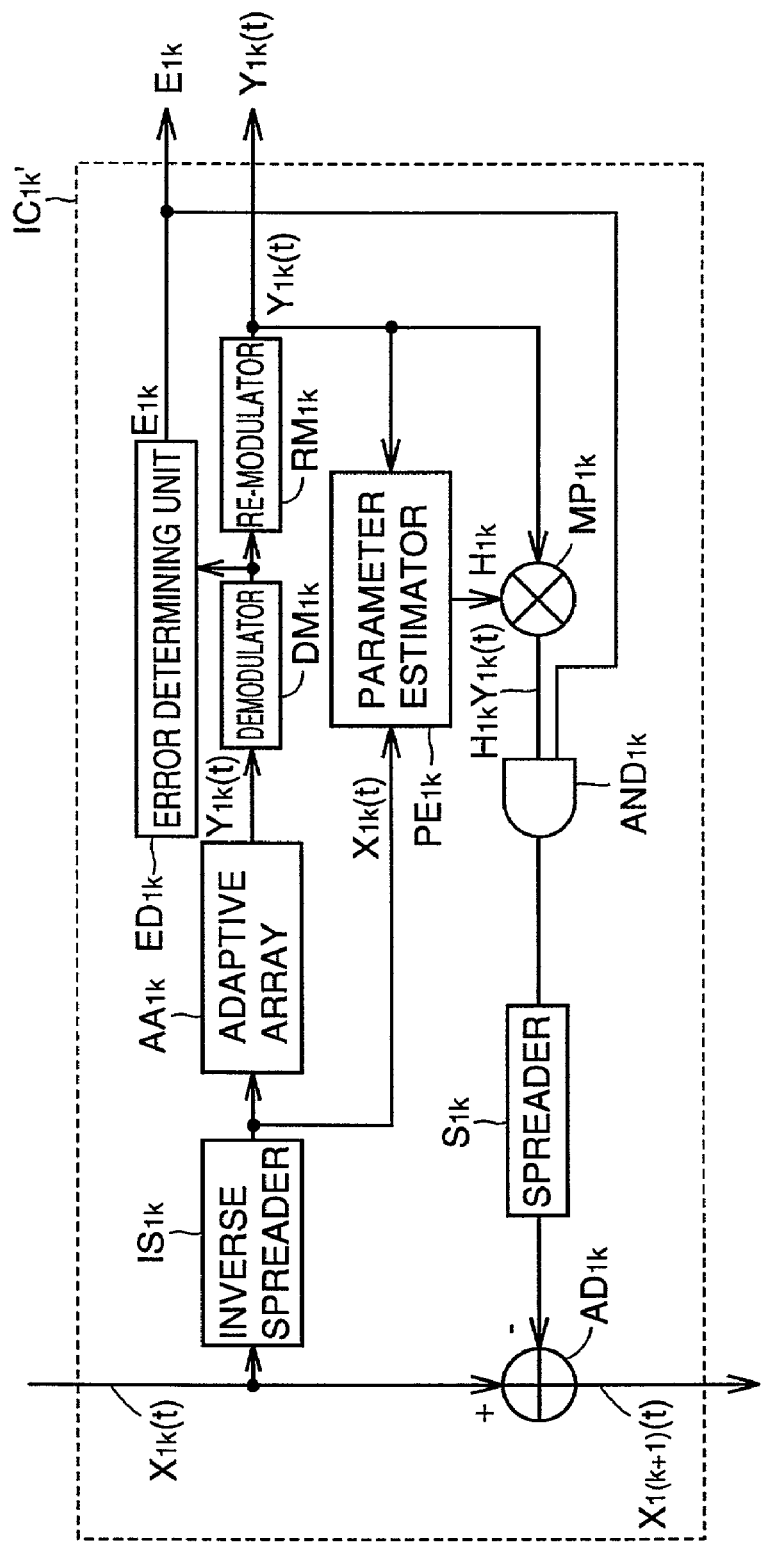
FIG. 20 is a block diagram representing a configuration of the interference removing unit of the reception system for the CDMA base station in accordance with an eleventh embodiment of the present invention.

FIG. 20 is a block diagram representing the reception system for the CDMA base station in accordance with the eleventh embodiment of the present invention. The eleventh embodiment shown in FIG. 20 is the same as the third embodiment shown in FIG. 8 except for the following point. Namely, for the interference removing unit of each stage, an inverse spreader for inverse spreading the input signal vector that has been transmitted in accordance with the CDMA communication method is provided (in the interference removing unit $IC_{1k}'$ of FIG. 9, inverse spreader $IS_{1k}$), in the preceding stage of the corresponding adaptive array and a parameter estimator. The input signal vectors inverse spread user by user by respective inverse spreaders are applied to the corresponding adaptive arrays and a parameter estimators, and respective user signals are extracted by the same operation as the third embodiment described above. The output of the multiplexer in each interference removing unit is again spread by a spreader (in FIG. 9, spreader $S_{1k}$), so as to perform subtraction from the corresponding input signal vector that has been spread by the CDMA method. Other operations are the same as those of the third embodiment shown in FIG. 8, and therefore, description thereof will not be repeated.

Though examples in which the CDMA communication method is applied to the first embodiment shown in FIGS. 3 to 5 and to the third embodiment shown in FIGS. 8 and 9 have been described as the tenth and eleventh embodiments, it is needless to say that the CDMA communication method can similarly be applied to the reception systems disclosed as other embodiments, though not shown.

Figure 21:
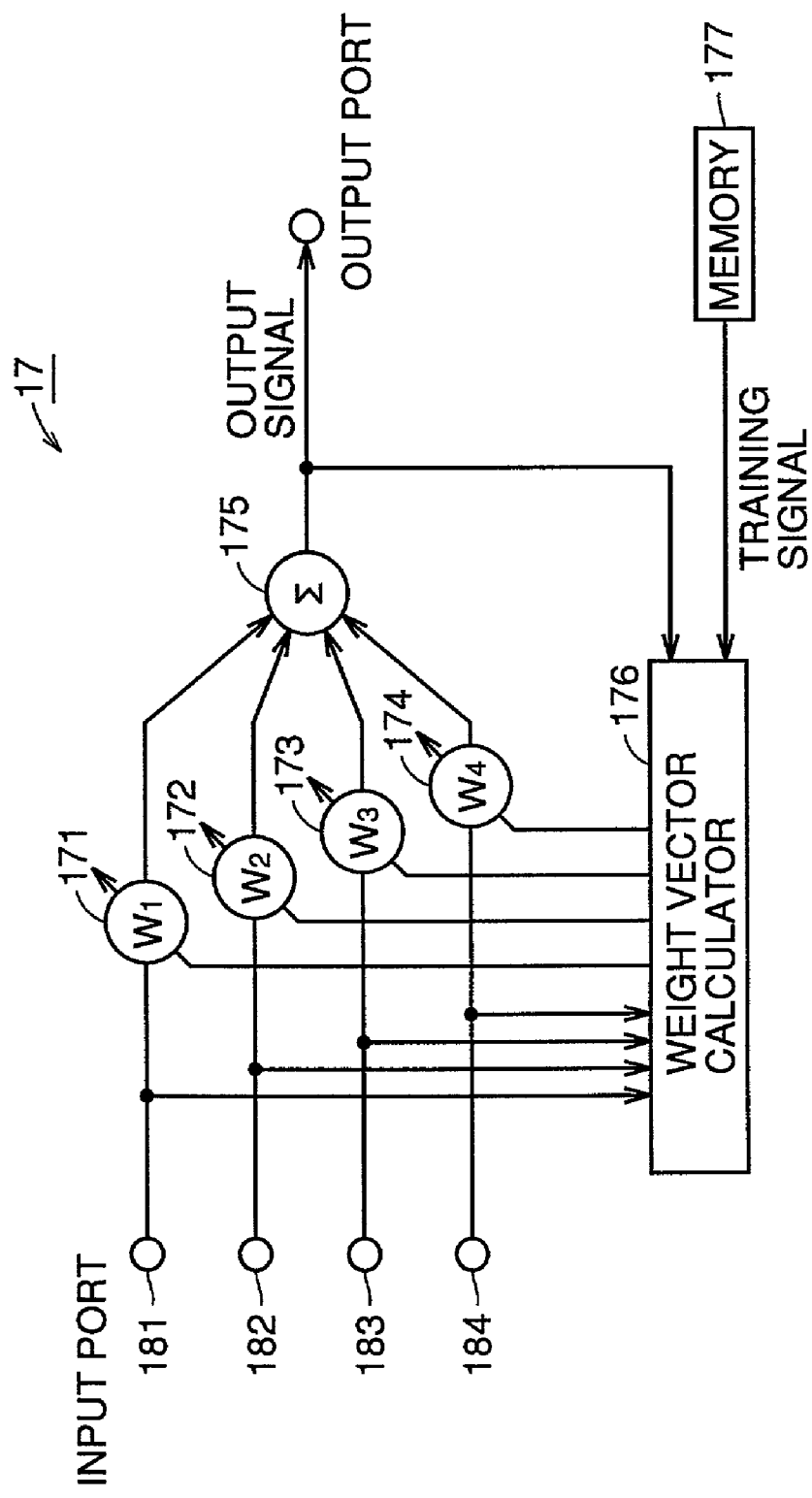
FIG. 21 is a block diagram representing a configuration of an adaptive array.
Figure 22:
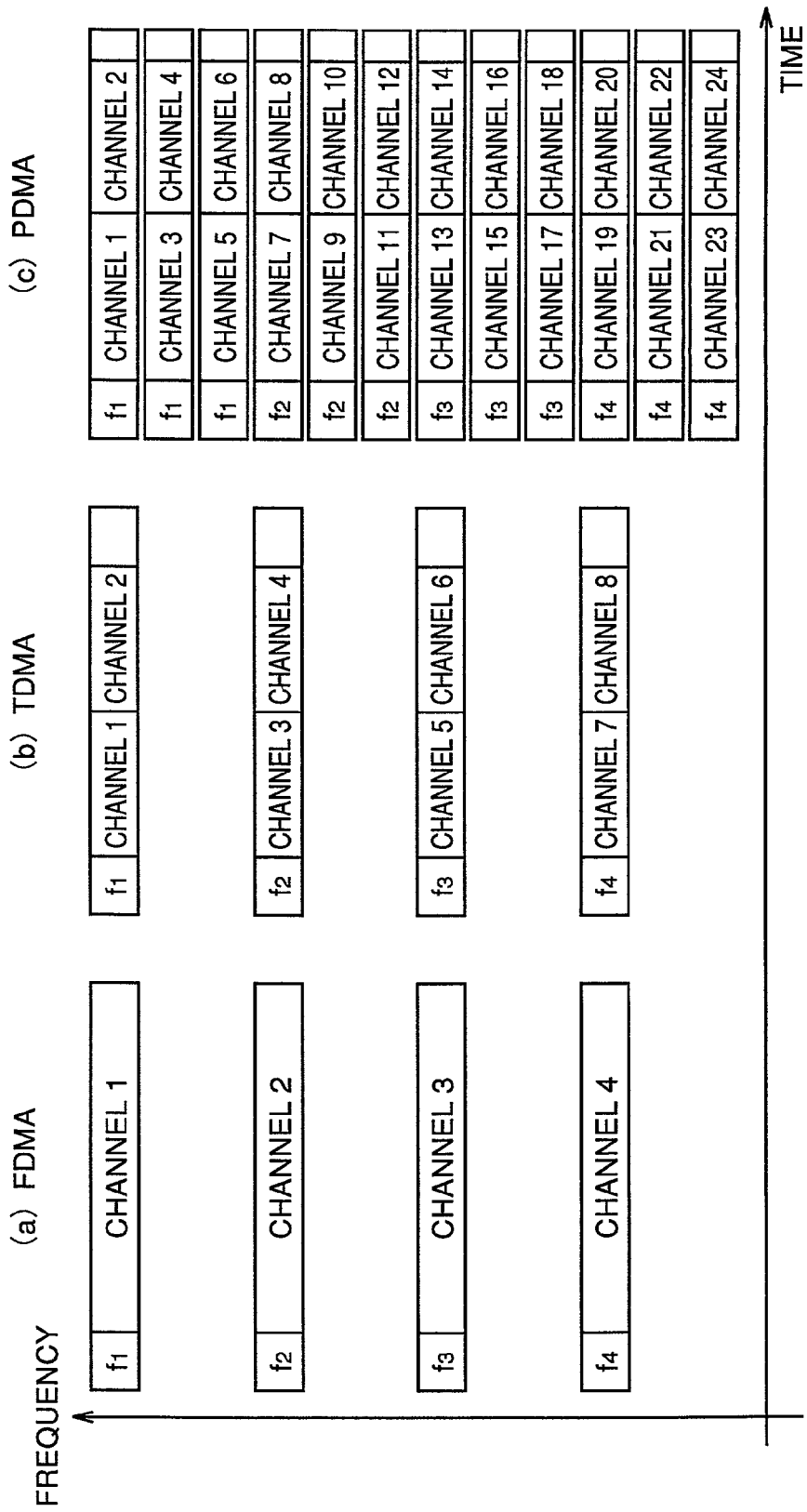
FIG. 22 shows channel arrangements of user signals in accordance with communication methods of FDMA, TDMA and PDMA, respectively.

FIG. 21 is a block diagram representing an example of the adaptive array 17 used in the reception system in each of the above described embodiments.

Referring to FIG. 21, each adaptive array is provided with input ports 181 to 184, to which input ports input signals from four antennas 3 to 6 that have been A/D converted by A/D converter 8 are input, respectively. The input signals are applied to a weight vector calculator 176 and multipliers 171 to 174.

Weight vector calculator 176 calculates weight vectors w1 to w4 so that a desired user signal is extracted, using the input signals from input ports 181 to 184 and a training signal corresponding to a specific user signal stored in advance in a memory 177 or an output of adder 175.

Multipliers 171 to 174 multiply the input signals of input ports 181 to 184 by the weight vectors w1 to w4, respectively, and provide the results to adder 175. Adder 175 adds respective output signals from multipliers 171 to 174, applies the resulting desired user signal to weight vector calculator 176 and outputs from an output port.

The first to eleventh embodiments described above are configured such that data re-modulated by a re-modulator is applied to the operating apparatus or the like. The output of the adaptive array and the re-modulated data can be essentially regarded as the data of the same contents, and therefore, similar effects can be attained even when an output data of adaptive array is input to the operating apparatus or the like.

In each of the above described embodiments, the reception system is implemented by a hardware configuration in which plural stages of interference cancellers are connected. These reception systems as a whole may be implemented by a software, using a digital signal processor (DSP).

Although the present invention has been described and illustrated in detail, it is clearly understood that the same is by way of illustration and example only and is not to be taken by way of limitation, the spirit and scope of the present invention being limited only by the terms of the appended claims.

As described above, according to the present invention, an interfering user signal component extracted by the signal extracting means corresponding to the user is removed from the input signal vector by the interference removing means, whereby the desired user signal component can be extracted with the interfering component much suppressed, and hence communication quality in a radio communication system such as mobile communication system can be improved.

Further, a user signal which is determined to have a demodulation error is excluded from the subtraction of the interfering wave component, and therefore, noise is not included in the output signal from the interference canceller.

Further, when estimating the reception signal coefficient vector, a correlation value between the signal component of a user of interest and the signal component of other user is actually calculated, and estimation is performed based on the result. Therefore, a reception signal coefficient vector closer to the one obtained in the actual propagation environment can be obtained, and thus it becomes possible to remove the interfering wave with higher precision.

INDUSTRIAL APPLICABILITY

As described above, the radio reception system in accordance with the present invention is applicable to improve communication quality by removing unnecessary user signal among signals received by a mobile terminal apparatus, in a base station of a mobile communication system such as PDMA or CDMA.

The invention claimed is:

1. A radio reception system capable of receiving signals from a plurality of users using a plurality of antennas, comprising:
   signal processing means for performing a prescribed signal processing on the signals received by said plurality of antennas;
   a plurality of first signal extracting means for extracting signal components corresponding to said plurality of users, respectively, based on a signal output from said signal processing means;
   a plurality of first estimating means for estimating parameter information related to relation between the signal components extracted by said first signal extracting means and the received signal output from said signal processing means;

a plurality of first error determining means for determining whether the signal components corresponding to the plurality of users extracted by said first signal extracting means include a demodulation error or not, respectively; and first operating means for subtracting, from the signal output from said signal processing means, said extracted signal component determined by said first error determining means not to include any demodulation error, in consideration of corresponding said parameter information.

2. The radio reception system according to claim 1, further comprising a plurality of second signal extracting means for extracting, based on the signal output from said first operating means, signal components corresponding to users determined by said first error determining means to include a demodulation error, respectively;

a plurality of second estimating means for estimating parameter information related to relation between the signal components extracted by said second signal extracting means and the signal output from said first operating means; and a plurality of second error determining means for determining whether the signal components extracted by said second signal extracting means include a demodulation error or not, respectively.

3. The radio reception system according to claim 2, further comprising second operating means for subtracting, from the signal output from said signal processing means, the signal component extracted by said first and second signal extracting means determined by said first and second error determining means not to include any demodulation error, in consideration of corresponding said parameter information.

4. The radio reception system according to claim 2, further comprising third operating means subtracting, from the signal output from said first operating means, the signal component extracted by said second signal extracting means determined by said second error determining means not to include any demodulation error, in consideration of corresponding said parameter information.

5. A radio reception system capable of receiving signals from a plurality of users using a plurality of antennas, comprising:

signal processing means for performing a prescribed signal processing on the signals received by said plurality of antennas;

a plurality of first signal extracting means for extracting signal components corresponding to said plurality of users, respectively, based on a signal output from said signal processing means;

a plurality of first estimating means for estimating parameter information related to relation between the signal components extracted by said first signal extracting means and the signal output from said signal processing means based on a correlation value between signal component of the corresponding user and signal component of another user;

a plurality of first error determining means for determining whether the signal components corresponding to the plurality of users extracted by said first signal extracting means include a demodulation error or not, respectively; and first operating means for subtracting, from the signal output from said signal processing means, said extracted signal component determined by said first error determining means not to include any demodulation error, in consideration of corresponding said parameter information.

6. The radio reception system according to claim 5, further comprising a plurality of second signal extracting means for extracting, based on the signal output from said first operating means, signal components corresponding to users determined by said first error determining means to include a demodulation error, respectively;

a plurality of second estimating means for estimating parameter information related to relation between the signal components extracted by said second signal extracting means and the signal output from said first operating means based on a correlation value between signal component of the corresponding user and signal component of another user; and a plurality of second error determining means for determining whether the signal components extracted by said second signal extracting means include a demodulation error or not, respectively.

7. The radio reception system according to claim 6, further comprising second operating means for subtracting, from the signal output from said signal processing means, the signal component extracted by said first and second signal extracting means determined by said first and second error determining means not to include any demodulation error, in consideration of corresponding said parameter information.

8. The radio reception system according to claim 6, further comprising third operating means subtracting, from the signal output from said first operating means, the signal component extracted by said second signal extracting means determined by said second error determining means not to include any demodulation error, in consideration of corresponding said parameter information.

9. The radio reception system according to any of claims 5 to 8, wherein said plurality of first estimating means estimate said parameter information by calculating said correlation value, independent from result of determination by said plurality of first error determination means.

10. The radio reception system according to any of claims 5 to 8, wherein said plurality of first estimating means estimate said parameter information by calculating said correlation value using signal components of the users determined not to include any demodulation error, based on the result of determination by said plurality of first error determining means.

11. The radio reception system according to any of claims 6 to 8, wherein said plurality of second estimating means estimate said parameter information by calculating said correlation value, independent from result of determination by said plurality of second error determination means.

12. The radio reception system according to any of claims 6 to 8, wherein said plurality of second estimating means estimate said parameter information by calculating said correlation value using signal components of the users determined not to include any demodulation error, based on the result of determination by said plurality of second error determining means.

13. A radio reception system capable of receiving signals from a plurality of users using a plurality of antennas, comprising:

signal processing means for performing a prescribed signal processing on the signals received by said plurality of antennas; and a first stage of interference cancellers, including a plurality of stages of interference removing units corresponding to said plurality of users; wherein each stage of said interference removing units includes first signal extracting means for extracting signal component corresponding to a specific user, different stage by stage, among said plurality of users based on an input signal, first estimating means for estimating parameter information related to relation between the signal component extracted by said first signal extracting means and the signal input to said first signal extracting means, first operating means for removing the signal component corresponding to said specific user, from the signal input to said first signal extracting means in consideration of said parameter information, and first error determining means for determining whether the signal component corresponding to said specific user includes a demodulation error or not, and when determined to include the demodulation error, disabling removal of the signal component corresponding to said specific user by said first operating means; and said plurality of stages of interference removing units are connected such that the signal output from said signal processing means is input to inputs of said first operating means and said first signal extracting means of the first stage of said interference removing units, and an output of said operating means of a former stage interference removing unit of adjacent two interference removing units is applied to inputs of said signal extracting means and said operating means of a latter stage interference removing unit.

14. The radio reception system according to claim 13, further comprising a next stage of interference cancellers receiving an output of said operating means of a last stage interference removing unit of said first stage of interference cancellers; wherein said next stage interference canceller includes a plurality of stages of interference removing units corresponding to said plurality of users;

each stage of said interference removing units includes second signal extracting means for extracting and outputting signal component corresponding to a specific user, different stage by stage, among said plurality of users, based on an input signal, second estimating means for estimating parameter information related to relation between the signal component extracted by said second signal extracting means and the signal input to said second signal extracting means, second operating means for removing the signal component corresponding to said specific user from the signals input to said second signal extracting means, in consideration of said parameter information, and second error determining means for determining whether the signal component corresponding to said specific user includes a demodulation error or not and, when determined to include an error, disabling removal of the signal component corresponding to said specific user by said second operating means;

the interference removing unit of said next stage interference canceller corresponding to a user determined not to include any demodulation error by the interference canceller of said first stage provides an output of the interference removing unit of the preceding stage as it is to the interference removing unit of the succeeding stage; and in the interference removing unit of said next stage interference canceller corresponding to the user determined to include a demodulation error by said first stage interference canceller, an output of the interference removing unit of the preceding stage is applied to inputs of said signal extracting means and said operating means, and an output of said operating means is output to the interference removing unit of the succeeding stage.

15. A radio reception system capable of receiving signals from a plurality of users using a plurality of antennas, comprising:

signal processing means for performing a prescribed signal processing on the signals received by said plurality of antennas; and a first stage of interference cancellers;

said first stage of interference canceller includes a plurality of stages of interference removing units corresponding to said plurality of users;

each stage of said interference removing units includes first signal extracting means for extracting and outputting signal component corresponding to a specific user, different stage by stage, among said plurality of users, based on an input signal, first estimating means for estimating, based on a correlation value between signal component of said specific user and signal component of another user, parameter information related to relation between the signal component extracted by said first signal extracting means and the signal output from said signal processing means, first error determining means for determining whether the signal component corresponding to said specific user includes a demodulation error or not, and first operating means for removing the signal component corresponding to a user determined not to include a demodulation error from the signal output from said signal processing means, in consideration of said parameter information; and said plurality of stages of interference removing units are connected such that the signal output from said signal processing means is input to inputs of said first operating means and said first signal extracting means of the first stage of said interference removing units, and an output of said operating means of a former interference removing unit of adjacent two interference removing units is applied to an input of said signal extracting means of a latter stage interference removing unit.

16. The radio reception system according to claim 15, further comprising a next stage of interference cancellers receiving an output of said operating means of the interference removing unit of the last stage of said first stage of interference cancellers; wherein said next stage interference canceller includes a plurality of stages of interference removing units corresponding to said plurality of users;

each stage of said interference removing unit includes
second signal extracting means for extracting and outputting signal component corresponding to a specific user, different stage by stage, among said plurality of users based on an input signal,
second estimating means for estimating, based on a correlation value between signal component of said specific user and signal component of another user, parameter information related to relation between the signal component extracted by said second signal extracting means and the signal output from said signal processing means,
second error determining means for determining whether or not the signal component corresponding to said specific user includes a demodulation error, and second operating means for removing the signal component corresponding to the user determined not to include any demodulation error from the signal output from said signal processing means, in consideration of said second parameter information;
the interference removing unit of said next stage interference canceller corresponding to the user determined not to include any demodulation error by said first stage interference canceller outputs an output of the interference removing unit of the preceding stage as it is to an interference removing unit of the succeeding stage; and
in the interference removing unit of said next stage interference canceller corresponding to the user determined to include a demodulation error by said first stage interference canceller, an output of the interference removing unit of the preceding stage is applied to an input of said signal extracting means, and an output of said operating means is output to the interference removing unit of the succeeding stage.

17. The radio reception system according to claim 15, wherein
said first estimating means calculates correlation value between the signal component of said specific user and signal component of another user independent from result of determination by said first error determining means, and estimates said parameter information based on the calculated correlation value.

18. The radio reception system according to claim 15, wherein
said first estimating means calculate the correlation value using only the signal components of the users determined not to include any demodulation error based on the result of determination by said first error determining means, and estimates said parameter information based on the calculated correlation value.

19. The radio reception system according to claim 1, 5, 13 or 15, wherein
said signal extracting means is an adaptive array spatially separating and extracting signal component corresponding to a specific user.

20. The radio reception system according to claim 1, 5, 13 or 15, wherein
said signal extracting means includes
an adaptive array spatially separating and extracting signal component corresponding to a specific user,
a demodulator demodulating an output of said adaptive array, and
a re-modulator re-modulating an output of said demodulator.

21. The radio reception system according to claim 1, 5, 13 or 15, wherein
the signals from said plurality of users are signals transmitted in accordance with PDMA communication method.

22. The radio reception system according to claim 1, 5, 13 or 15, wherein
the signals from said plurality of users are signals transmitted in accordance with CDMA communication method.

23. The radio reception system according to claim 22, wherein
the signals transmitted in accordance with said CDMA communication method are spread by predetermined spreading codes in advance on a transmitting side,
said system further comprising
inverse spreading means for inverse spreading signals output from said signal processing means by corresponding spreading codes in accordance with CDMA communication method and applying the results to said signal extracting means.

24. The radio reception system according to claim 16, wherein
said second estimating means calculates the correlation value between the signal component of said specific user and signal component of another user independent from result of determination by said second error determining means, and estimates said parameter information based on the calculated correlation value.

25. The radio reception system according to claim 16, wherein
said second estimating means calculates the correlation value using only the signal component of the users determined not to include any demodulation error based on the result of determination by said second error determining means, and estimates said parameter information based on the calculated correlation value.

* * * * *